(12) United States Patent
Guan et al.

(10) Patent No.: US 10,680,958 B2
(45) Date of Patent: *Jun. 9, 2020

(54) POLICY ENFORCEMENT AS A SERVICE FOR THIRD PARTY PLATFORMS

(71) Applicant: salesforce.com, inc., San Francisco, CA (US)

(72) Inventors: Colbert Guan, San Francisco, CA (US); Jigna Bhatt, San Francisco, CA (US); Thomas Nicholas Valine, San Francisco, CA (US); Ruofan Zhang, San Francisco, CA (US); Sampath Tulava, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 15/885,594

(22) Filed: Jan. 31, 2018

(65) Prior Publication Data

US 2019/0238467 A1   Aug. 1, 2019

(51) Int. Cl.

| | |
|---|---|
| *H04L 12/813* | (2013.01) |
| *H04L 29/06* | (2006.01) |
| *H04L 12/24* | (2006.01) |
| *H04L 29/08* | (2006.01) |

(Continued)

(52) U.S. Cl.
CPC .......... *H04L 47/20* (2013.01); *H04L 41/0681* (2013.01); *H04L 41/0893* (2013.01); *H04L 43/0882* (2013.01); *H04L 63/0227* (2013.01); *H04L 63/102* (2013.01); *H04L 63/20* (2013.01); *H04L 67/16* (2013.01); *H04L 49/90* (2013.01)

(58) Field of Classification Search
CPC .. G06F 16/2365; G06F 16/289; G06F 16/211; G06F 16/2228; G06F 16/24565; G06F 9/5072; G06F 11/28; G06F 16/27; G06F 16/9024; G06F 16/951; G06F 16/954; G06Q 30/016; H04L 41/5003; H04L 41/5041; H04L 41/5096; H04L 5/0048; H04L 5/0051; H04L 5/0094
See application file for complete search history.

(56) References Cited

U.S. PATENT DOCUMENTS

| | | |
|---|---|---|
| 5,442,785 A | 8/1995 | Roffe |
| 5,577,188 A | 11/1996 | Zhu |
| 5,608,872 A | 3/1997 | Schwartz et al. |

(Continued)

OTHER PUBLICATIONS

Warden-Service, https://github.com/jbhatt-salesforce/Warden-Service/wiki; Feb. 5, 2017.

(Continued)

*Primary Examiner* — Ninos Donabed
(74) *Attorney, Agent, or Firm* — Schwabe Williamson & Wyatt

(57) ABSTRACT

Systems, methods, and computer-readable media for providing a Policy Enforcement as a Service (PEaaS) are described. The PEaaS may allow customer service providers to define policies for usage restrictions to be implemented across their distributed systems/platforms. The policy enforcement mechanisms of the PEaaS may prevent users from overloading the systems/platforms of the customer service providers. Other embodiments may be described and/or claimed.

19 Claims, 15 Drawing Sheets

(51) Int. Cl.
*H04L 12/26* (2006.01)
*H04L 12/861* (2013.01)

(56) References Cited

U.S. PATENT DOCUMENTS

| | | | |
|---|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,363,309 B1* | 4/2008 | Waite ................ G06F 16/2428 |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,831,545 B1* | 11/2010 | Betz ................ G06F 16/313 707/603 |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,265,713 B2 | 9/2012 | Tashiro |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,819,083 B2* | 8/2014 | Busch ................ G06F 16/2423 707/805 |
| 10,033,617 B2 | 7/2018 | Cooke |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |

(56) References Cited

U.S. PATENT DOCUMENTS

| | | |
|---|---|---|
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0156754 A1* | 7/2007 | Busch ............... G06F 16/2423 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0040592 A1 | 2/2011 | Kurtzig |
| 2011/0213783 A1* | 9/2011 | Keith, Jr. ............ G06F 16/954 707/741 |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2016/0127565 A1* | 5/2016 | Sharma ............... H04M 15/67 455/406 |
| 2016/0179869 A1* | 6/2016 | Hutchins ............ G06F 16/2365 707/703 |
| 2016/0191366 A1 | 6/2016 | Cooke |
| 2017/0189812 A1* | 7/2017 | Ozer ..................... A63F 13/60 |
| 2017/0273006 A1* | 9/2017 | Hua ..................... H04L 43/16 |
| 2017/0308067 A1* | 10/2017 | Lamparter .......... G05B 19/4183 |
| 2018/0130239 A1* | 5/2018 | Mohr .................. G06T 11/206 |
| 2018/0278563 A1* | 9/2018 | Frost ..................... H04L 51/16 |
| 2019/0044949 A1* | 2/2019 | Bartfai-Walcott ........................ H04W 12/00506 |

OTHER PUBLICATIONS

USPTO, Non-Final Office Action for U.S. Appl. No. 15/885,664, dated Sep. 27, 2019, 23 pages.

USPTO, Non-Final Office Action for U.S. Appl. No. 15/885,683, dated Oct. 11, 2019, 19 pages.

* cited by examiner

POLICY ENFORCEMENT AS A SERVICE FOR THIRD PARTY PLATFORMS

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to database systems, and in particular to systems and methods for providing policy enforcement as a service.

BACKGROUND

In multi-tenant database systems, customer organizations (also referred to as "tenants") may share database resources in one logical database. The databases themselves are typically shared, and each tenant is typically associated with an organization identifier (org ID) column or field that may be used to identify rows or records belonging to each tenant. Each tenant may provide their own custom data, which may include defining custom objects and custom fields, as well as designating one or more custom fields to act as custom index fields. Users of a multi-tenant database system (e.g., a tenant/organization (org) or developers associated with the tenant) may develop applications or platforms that interact or integrate with the multi-tenant database system and utilize data from an associated tenant space. The applications/platforms may obtain data from the associated tenant space to render/display visual representations of relevant tenant data. Systems to provide services (e.g., web services) may experience service degradation or disruption. The cause of such service disruptions may be one or more users that consume large amounts of resources relative to other users, such as by flooding the system with numerous calls or requests. In order to mitigate these service disruptions, some service providers (e.g., web service providers) may attempt to detect or identify client devices that are causing service disruptions, and that suspend the offending client devices from using the disrupted services.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
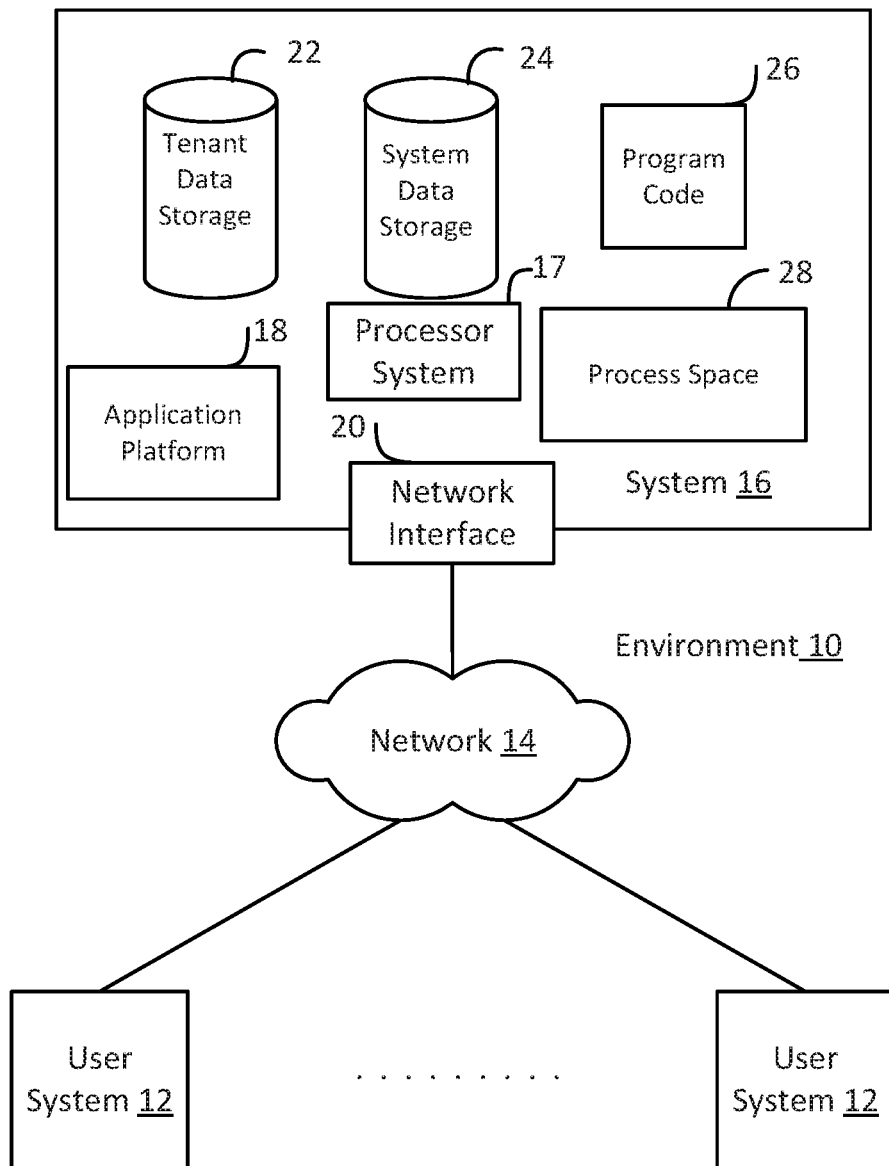
FIG. 1A shows a block diagram of an example environment in which an on-demand database service can be used according to some implementations.

Embodiments discussed herein provide a framework for a Policy Enforcement as a Service (PEaaS) that enforces resource-protection policies for distributed systems/platforms (the PEaaS may be referred to as "Warden," "Warden as a Service," or "WaaS"). The PEaaS may be implemented by a multi-tenant system or may be implemented as a standalone system/service. The PEaaS may allow customers to define policies for usage restrictions to be implemented across their distributed systems/platforms to prevent users from overloading the customer systems/platforms.

The PEaaS is responsible for tracking user infractions and issuing user suspensions based on the customer-defined policies. The customer service providers (or third party platforms "TPPs") may define policies that specify a threshold number of user requests, queries, resource accesses, etc., that their users are allowed to send during a defined period of time. A policy may be defined for an entire platform of a TPP, or a TPP may define multiple policies that correspond to individual services provided by the TPP. The policies may also define a frequency for evaluating whether infractions have occurred. In embodiments, the orgs implement or embed a PEaaS interface in their platform/application code. The PEaaS interface provides user requests, which were sent to the TPP by user systems, to a PEaaS back-end system ("PEaaS Web Service" or "PEaaS-WS") for determining usage metrics for various users/clients of a TPP.

In embodiments, the PEaaS-WS may generate and store usage metrics for each client or user system in a first database, generate and store the TPP policies in a second database, and generate and queue an alert for each user request in a message queue. An alert is an attribute-value pair or other like data structure with a user identifier (user_id) as a value and a policy identifier (policy_id) as an attribute. The user_id may identify a user system or client that sent a user request, and the policy_id may identify a policy of a TPP or a particular service provided by a TPP. The PEaaS-WS may queue each alert in a message queue for consumption by an alert client.

In embodiments, the alert client may process each queued alert according to an evaluation frequency of policy indicated by the policy_id of that alert. The alert client compares the alerts against stored usage metrics to determine whether an infraction has occurred. If an infraction has occurred, then the alert client may generate an infraction record and store the infraction record in the second database. The PEaaS-WS may then obtains the infraction records from the second database and determine whether any users should be suspended based on the number of infractions that have occurred for a particular user, as defined by a policy associated with that user. The PEaaS-WS may transmit a list of suspensions to a TPP via the PEaaS interface on a periodic basis. The PEaaS interface may poll the PEaaS-WS for the list of suspensions based on an interval specified by the policy. Other embodiments may be described and/or claimed.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

As used herein, the term "tenant" may include a group of users who share common access with specific privileges to a software instance. A multi-tenant architecture, such as those discussed herein, may provide a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants. As used herein, the term an "instance" may refer to a concrete occurrence of an object, which may occur, for example, during execution of program code, and the terms "instantiate", "instantiation", and the like may refer to the creation of an instance.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In embodiments, the tenant data storage 22, the system data storage 24, and/or some other data store (not shown) may include Extract-Load-Transform (ELT) data or Extract-Transform-Load (ETL) data, which may be raw data extracted from various sources and normalized (e.g., indexed, partitioned, augmented, canonicalized, etc.) for analysis and other transformations. In some embodiments, the raw data may be loaded into the tenant data storage 22, the system data storage 24, and/or some other data store (not shown) and stored as key-value pairs, which may allow the data to be stored in a mostly native form without requiring substantial normalization or formatting.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16. The applications of the application platform 18 may be developed with server-side programming languages, such as PHP, Java and/or Java Server Pages (JSP), Node.js, ASP.NET, and/or any other like technology that renders HTML. The applications may be built using a platform-specific and/or proprietary development tool and/or programming languages, such as Salesforce® Apex and/or the like.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a local area network (LAN), a wireless LAN (WLAN), wide area network (WAN), telephone network, wireless network, cellular network, point-to-point network, star network, token ring network, hub network, or other appropriate configuration including proprietary and/or enterprise networks, or combinations thereof. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol. The network 14 may comprise one or more network elements, each of which may include one or more processors, communications systems (e.g., including network interface controllers, one or more transmitters/receivers connected to one or more antennas, etc.), and computer readable media. Examples of such network elements may include wireless APs (WAPs), a home/business server (with or without radio frequency (RF) communications circuitry), routers, switches, hubs, radio beacons, (macro or small-cell) base stations, servers (e.g., stand-alone, rack-mounted, blade, etc.), and/or any other like devices/systems. Connection to the network 14 may be via a wired or a wireless connection using one or more of the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. Connection to the network 14 may require that the various devices and network elements execute software routines which enable, for example, the seven layers of the open systems interconnection (OSI) model of computer networking or equivalent in a wireless network.

The user systems 12 can communicate with system 16 using TCP/IP and, at a higher network level, other common Internet protocols to communicate, such as Hypertext Transfer Protocol (HTTP), File Transfer Protocol (FTP), Andrew File System (AFS), Wireless Application Protocol (WAP), Session Initiation Protocol (SIP) with Real-Time Transport Protocol (RTP or Secure RTP (SRTP), Web-based secure shell (SSH), Extensible Messaging and Presence Protocol (XMPP), WebSocket protocol, etc. In an example where HTTP is used, each user system 12 can include an HTTP client commonly referred to as a "web browser" or simply a "browser" for sending and receiving HTTP signals to and from an HTTP server (also referred to as a "web server") of the system 16. In this example, each user system 12 may send and receive HTTP messages where a header of each message includes various operating parameters and the body of the such messages may include HTML, Extensible Markup Language (XML), Java Script Object Notion (JSON), Cascading Stylesheets (CSS), JavaServer Pages (JSP), MessagePack™, Apache® Thrift, Abstract Syntax Notation One (ASN.1), Google® Protocol Buffers (protobuf), database objects, or some other like object(s)/document(s). Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device (e.g., Personal Data Assistants (PDAs), pagers, portable media player, etc.), a mobile cellular phone (for example, a "smartphone"), or any other WiFi-enabled device, WAP-enabled device, or other computing device capable of interfacing directly or indirectly to the Internet or other network (e.g., network 14). The terms "user system", "computing device", "computer system", or the like may be used interchangeably herein with one another and with the term "computer."

As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, and/or the like, to execute and render web applications allowing a user (for example, a subscriber of on-demand services provided by the system 16) of the user system 12 to access, process and view information, pages, interfaces, and applications available to it from the system 16 over the network 14. In other implementations, each user system 12 may operate a user (or third party) application designed to interact with applications of the application platform 18 allowing a user (for example, a subscriber of on-demand services provided by the system 16) of the user system 12 to access, process and view information, pages and applications available to it from the system 16 over the network 14. In some cases, an owner/operator of database system 16 may have pre-built the web or user applications for use by clients, customers, and/or agents of a tenant organization (org) to access a tenant space or enterprise social network of that tenant org. In some cases, developers associated with a tenant org may build custom application(s) for interacting with the tenant data. The user (or third party) application(s) may be native application(s) (e.g., executed and rendered in an application container) or hybrid application(s) (e.g., web applications being executed/rendered in an application container or skeleton). The user (or third party) application(s) may be platform-specific, or developed to operate on a particular type of user system 12 or a particular (hardware and/or software) configuration of a user system 12. The term "platform-specific" may refer to the platform implemented by the user system 12, the platform implemented by the database system 16, and/or a platform of a third party system.

In an example, the user systems 12 may implement web, user, or third party applications to request and obtain data from database system 16, and render graphical user interfaces (GUIs) in an application container or browser. In some implementations, the GUIs may include a data analytics GUI, such as Salesforce® Wave™ dashboard, which may provide visual representations of data residing in an enterprise cloud or in an on-demand services environment (e.g., a tenant space within database system 16). The GUIs may include one or more components (e.g., graphical control elements (GCEs), tabs, reports, dashboards, widgets, pages, etc.). Examples of such components may include audio/video calling components, messaging components (e.g., chat, instant messaging, short message service (SMS)/multimedia messaging service (MMS) messaging, emailing, etc.), and visualization components. The visualization components may enable a user of a user system 12 to select visualization parameters (also referred to as "lens parameters" or "filters") for displaying data from one or more datasets. A dataset may be a specific view or transformation of data from one or more data sources (e.g., a tenant space of database 22, etc.). The visualization parameters may include, for example, a selection of data or data type to display from one or more datasets; a particular graph, chart, or map in which to view the selected data; color schemes for the graphs/charts/maps; a position or orientation of the graphs/charts/maps within a particular GUI, etc. The graphs/charts/maps to be displayed may be referred to as a "lens" or a "dashboard". A lens may be a particular view of data from one or more datasets, and a dashboard may be a collection of lenses. In some implementations, a GUI may display lenses, dashboards, and/or control panels to alter or rearrange the lenses/dashboards. Furthermore, the various application(s) discussed herein may also enable the user system 12 to provide authentication credentials (e.g., user identifier (user_id), password, personal identification number (PIN), digital certificates, etc.) to the database system 16 so that the database system 16 may authenticate the identity of a user of the user system 12.

The web, user, or third party application(s) discussed herein may be a software, program code, logic modules, application packages, etc. that are built using website development tools and/or programming languages, such as HTML, CSS, JavaScript, JQuery, and the like; and/or using platform-specific development tools and/or programming languages (e.g., Salesforce® Apex, Salesforce® Visualforce®, Salesforce® Lightning®, Salesforce® Wave™ Dashboard Designer, Salesforce® Force.com® IDE, Android® Studio™ integrated development environment (IDE), Apple® iOS® software development kit (SDK), etc.). Furthermore, such applications may utilize a suitable querying language to query and store information in an associated tenant space, such as Structure Query Language (SQL), object query language (OQL), Salesforce® OQL (SOQL), Salesforce® object search language (SOSL), Salesforce® analytics query language (SAQL), and/or other like query languages.

Each user system 12 typically includes an operating system (OS) to manage computer hardware and software resources, and provide common services for various applications. The OS may include one or more drivers and/or APIs that provide an interface to hardware devices thereby enabling the OS and applications to access hardware functions. In some embodiments, the OS may include middleware that may connect two or more separate applications or connect applications with underlying hardware components beyond those available from OS and/or the drivers/APIs. The OS may be a general purpose operating system or an operating system specifically written for and tailored to the user system 12.

Each user system 12 also typically includes one or more user input devices, such as a keyboard, a mouse, a trackball, a touch pad, a touch screen, a pen or stylus or the like, for interacting with a GUI provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

Figure 1B:
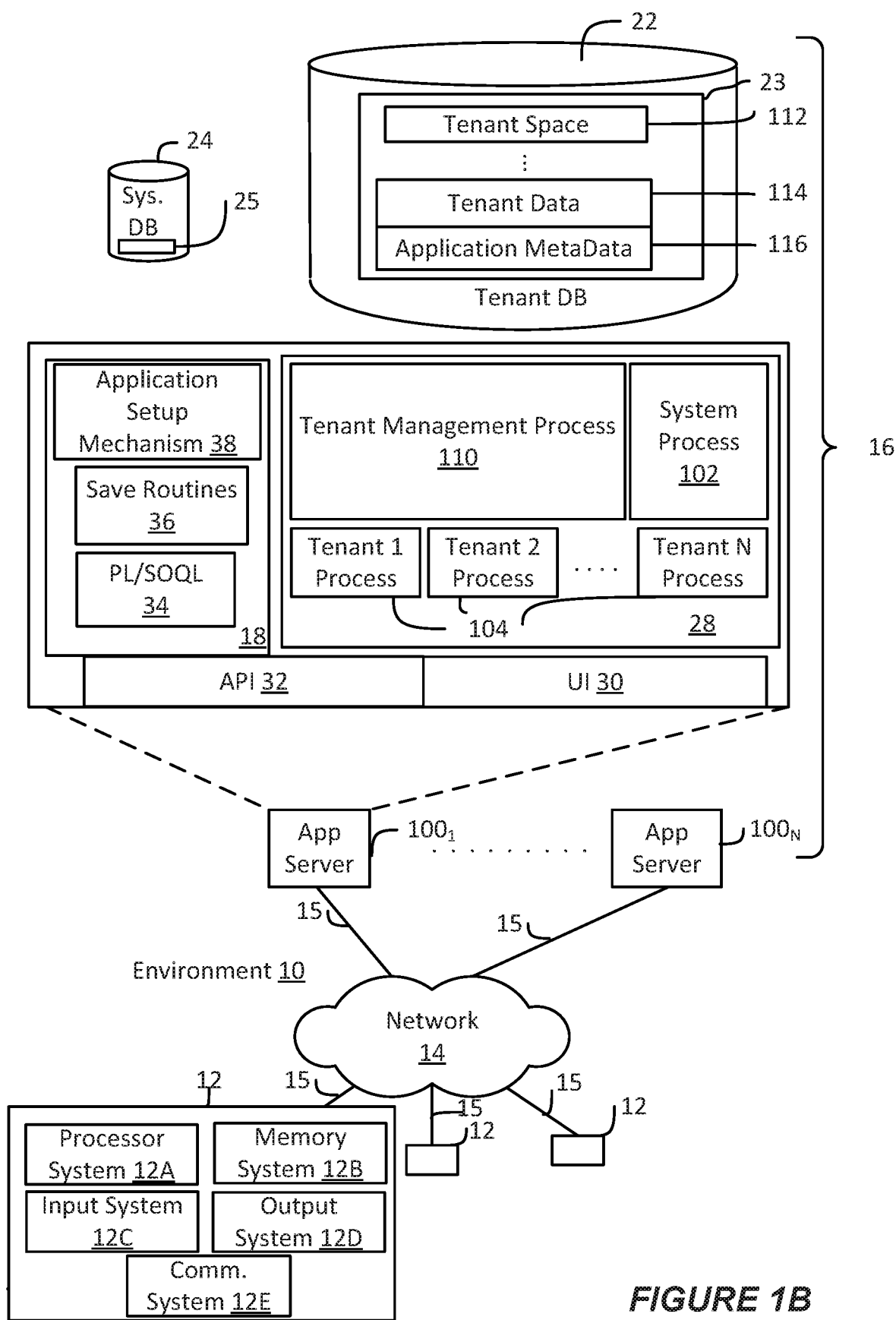
FIG. 1B shows a block diagram of example implementations of elements of FIG. 1A and example interconnections between these elements according to some implementations.

According to some implementations, each user system 12 and some or all of its components are operator-configurable using applications, such as a browser, including computer code executed using one or more central processing units (CPUs) and/or other like computer processing devices (see e.g., processor system 12B of FIG. 1B). Similarly, the system 16 (and additional instances of an MTS, where more than one is present) and all of its components can be operator-configurable using application(s) including computer code to run using the processor system 17, which may include one or more CPUs/processors. Examples of the processors/CPUs of processor system 17 may include one or multiple Intel Pentium® or Xeon® processors, one or more AMD Epyc® processors, or the like.

The system 16 includes tangible computer-readable media having non-transitory instructions stored thereon/in that are executable by or used to program a server (e.g., the app servers 100 or other servers discussed herein) or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, an output system 12D, and a communications system 12E.

The processor system 12A can include any suitable combination of one or more processors, such as one or more central processing units (CPUs) including single-core or multi-core processors (such as those discussed herein), one or more graphics processing units (GPUs), one or more field-programmable gate arrays (FPGAs), or any other electronic circuitry capable of executing program code and/or software modules to perform arithmetic, logical, and/or input/output operations. As examples, the processor system 12A may include Intel® Pentium® or Core™ based processor(s); Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); or the like.

The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The memory system 12B may store program code for various applications (such as the various application discussed herein) for carrying out the procedures, processes, methods, etc. of the embodiments discussed herein, as well as an operating system (OS) and one or more databases. The OS may manage computer hardware and software resources, and provide common services for the applications via one or more drivers and/or APIs that provide an interface to hardware devices thereby enabling the OS and applications to access hardware functions. The memory system 12B may also include middleware that may connect two or more separate applications or connect applications with underlying hardware components beyond those available from OS and/or the drivers/APIs. The OS may be a general-purpose operating system or an operating system specifically written for and tailored to the user system 12.

The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

The communications system 12E may include circuitry for communicating with a wireless network or wired network. Communications system 12E may be used to establish a link 15 (also referred to as "channel 15," 'networking layer tunnel 15," and the like) through which the user system 12 may communicate with the database system 16. Communications system 12E may include one or more processors (e.g., baseband processors, network interface controllers, etc.) that are dedicated to a particular wireless communication protocol (e.g., Wi-Fi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches; filters; amplifiers; antenna elements; wires, ports/receptacles/jacks/sockets, and plugs; and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the database system 16, the user system 12 using the communications system 12E may establish link 15 with network interface 20 of the database system 16.

In FIG. 1B, the network interface 20 is implemented as a set of HTTP application servers $100_1$-$100_N$. Each application server 100 (also referred to herein as an "app server", an "application programming interface (API) server", a "worker node", and/or the like) is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' ("app developers") creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

In various implementations, application platform 18 may be a development environment, programming language, and/or tools (collectively referred to as a "development environment", "dev-environment" and the like) that allows app developers to create/edit applications for implementing the various embodiments discussed herein. As examples, the dev-environment may be or include a software development environment (SDE), an integrated development environment (IDE), a software development kit (SDK), a software development platform (SDP), a schema builder, a modeling language application, a source code editor, build automation tools, debugger, compiler, interpreter, and/or some other like platform, framework, tools, etc. that may assist an app developer in building applications, configurations, definitions, and/or the like. In some implementations, the dev-environment may be a standalone application, or may be a web-based or cloud-based environment (e.g., a native application, a web application, or a hybrid application including GUIs that render an SDE/IDE/SDK/SDP implemented by a backend service (e.g., database system 16, a cloud service provider, etc.) in a web browser or application container).

The system 16 of FIG. 1B also includes a user interface (UI) 30 and an API 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection 15. For example, one application server $100_1$ can be coupled via the network 14 (for example, the Internet), another application server $100_{N-1}$ can be coupled via a direct network link 15, and another application server $100_N$ can be coupled by yet a different network connection 15. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. In this regard, each application server 100 may be configured to perform various database functions (e.g., indexing, querying, etc.) as well as formatting obtained data (e.g., ELT data, ETL data, etc.) for various user interfaces to be rendered by the user systems 12. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. As used herein, a "database object", "data object", or the like may refer to any representation of information in a database that is in the form of an object or tuple, and may include variables, data structures, functions, methods, classes, database records, database fields, database entities, associations between data and database entities (also referred to as a "relation"), and the like. A "table" is one representation of a data object, and may be used herein to simplify the conceptual description of objects and custom objects according to some implementations. It should be understood that "table" and "data(base) object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
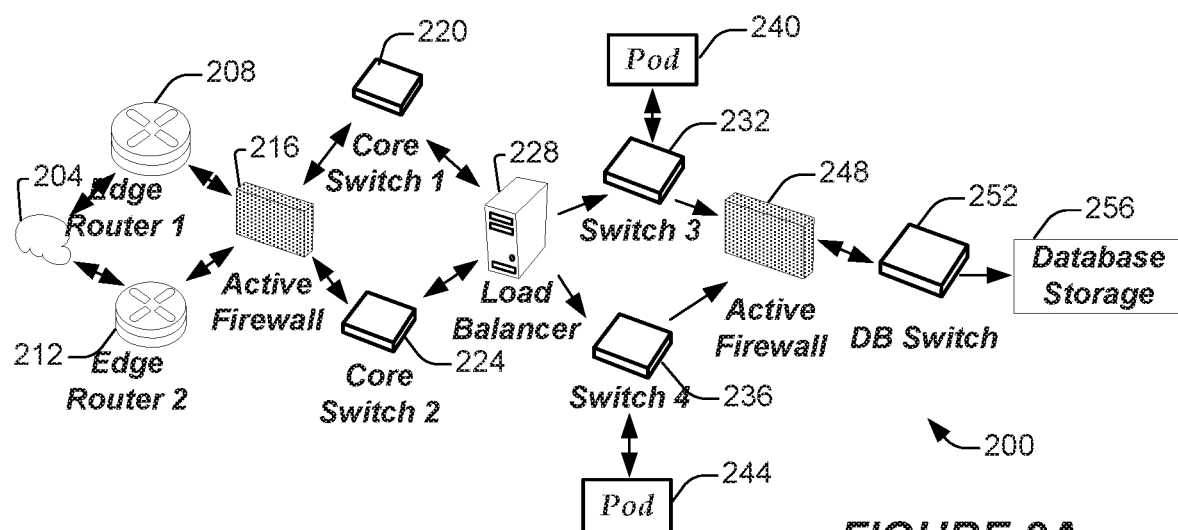
FIG. 2A shows a system diagram of example architectural components of an on-demand database service environment according to some implementations.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
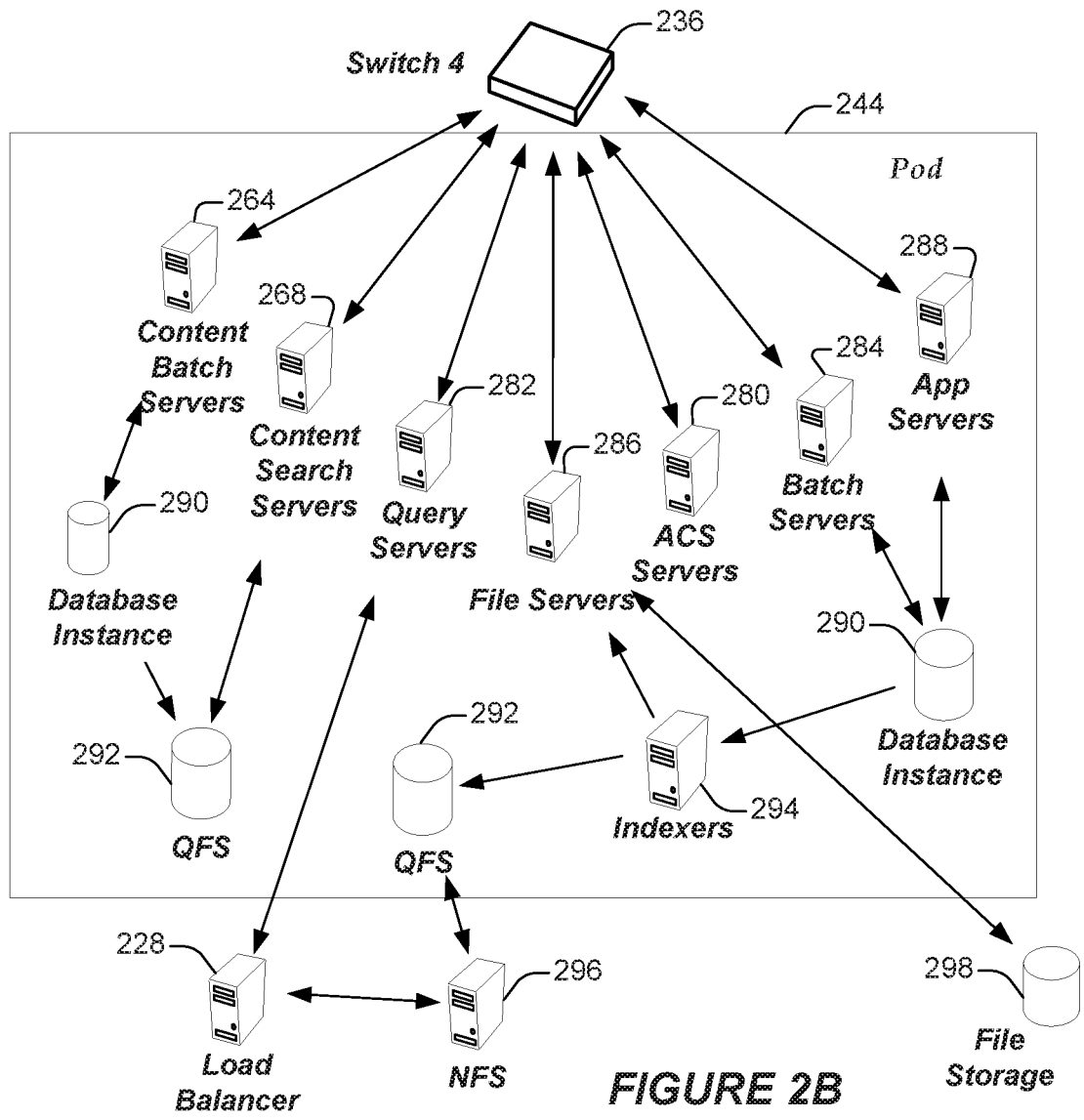
FIG. 2B shows a system diagram further illustrating example architectural components of an on-demand database service environment according to some implementations.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to several devices of each type. Also, the on-demand database service environment need not include each device shown in FIGS. 2A and 2B, or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 204 is intended to refer to a data network or multiple data networks, often including the Internet. Client machines communicably connected with the cloud 204 can communicate with other components of the on-demand database service environment 200 to access services provided by the on-demand database service environment. For example, client machines can access the on-demand database service environment to retrieve, store, edit, or process information. In some implementations, the edge routers 208 and 212 route packets between the cloud 204 and other components of the on-demand database service environment 200. For example, the edge routers 208 and 212 can employ the Border Gateway Protocol (BGP). The BGP is the core routing protocol of the Internet. The edge routers 208 and 212 can maintain a table of IP networks or 'prefixes', which designate network reachability among autonomous systems on the Internet.

In some implementations, the firewall 216 can protect the inner components of the on-demand database service environment 200 from Internet traffic. The firewall 216 can block, permit, or deny access to the inner components of the on-demand database service environment 200 based upon a set of rules and other criteria. The firewall 216 can act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 can be configured as network bridges that quickly route data between different components within the on-demand database service environment. In some implementations, the use of two or more core switches 220 and 224 can provide redundancy or reduced latency.

In some implementations, the pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 can facilitate communication between the pods 240 and 244 and client machines communicably connected with the cloud 204, for example via core switches 220 and 224. Also, the pod switches 232 and 236 may facilitate communication between the pods 240 and 244 and the database storage 256. In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the database storage 256 is guarded by a database firewall 248. The database firewall 248 can act as a computer application firewall operating at the database application layer of a protocol stack. The database firewall 248 can protect the database storage 256 from application attacks such as structure query language (SQL) injection, database rootkits, and unauthorized information disclosure. In some implementations, the database firewall 248 includes a host using one or more forms of reverse proxy services to proxy traffic before passing it to a gateway router. The database firewall 248 can inspect the contents of database traffic and block certain content or database requests. The database firewall 248 can work on the SQL application level atop the TCP/IP stack, managing applications' connection to the database or SQL management interfaces as well as intercepting and enforcing packets traveling to or from a database network or application interface.

In some implementations, communication with the database storage 256 is conducted via the database switch 252. The multi-tenant database storage 256 can include more than one hardware or software components for handling database queries. Accordingly, the database switch 252 can direct database queries transmitted by other components of the on-demand database service environment (for example, the pods 240 and 244) to the correct components within the database storage 256. In some implementations, the database storage 256 is an on-demand database system shared by many different organizations as described above with reference to FIGS. 1A and 1B.

FIG. 2B shows a system diagram further illustrating example architectural components of an on-demand database service environment according to some implementations. The pod 244 can be used to render services to a user of the on-demand database service environment 200. In some implementations, each pod includes a variety of servers or other systems. The pod 244 includes one or more content batch servers 264, content search servers 268, query servers 282, file force servers 286, access control system (ACS) servers 280, batch servers 284, and app servers 288. The pod 244 also can include database instances 290, quick file systems (QFS) 292, and indexers 294. In some implementations, some or all communication between the servers in the pod 244 can be transmitted via the switch 236.

In some implementations, the app servers 288 include a hardware or software framework dedicated to the execution of procedures (for example, programs, routines, scripts) for supporting the construction of applications provided by the on-demand database service environment 200 via the pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods. In various implementations, the app servers 288 may be the same or similar to the app servers 100 discussed herein.

The content batch servers 264 can handle requests internal to the pod. Some such requests can be long-running or not tied to a particular customer. For example, the content batch servers 264 can handle requests related to log mining, cleanup work, and maintenance tasks. The content search servers 268 can provide query and indexer functions. For example, the functions provided by the content search servers 268 can allow users to search through content stored in the on-demand database service environment. The file servers 286 can manage requests for information stored in the file storage 298. The file storage 298 can store information such as documents, images, and basic large objects (BLOBs). By managing requests for information using the file force servers 286, the image footprint on the database can be reduced. The query servers 282 can be used to retrieve information from one or more file systems. For example, the query system 282 can receive requests for information from the app servers 288 and transmit information queries to the NFS 296 located outside the pod.

The pod 244 can share a database instance 290 configured as a multi-tenant environment in which different organizations share access to the same database. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 can transmit instructions to other servers, such as the app servers 288, to trigger the batch jobs.

In some implementations, a QFS 292 is an open source file system available from Sun Microsystems® of Santa Clara, Calif. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the network file systems 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed. In some implementations, queries from the query servers 282 are transmitted to the NFS 296 via the load balancer 228, which can distribute resource requests over various resources available in the on-demand database service environment. The NFS 296 also can communicate with the QFS 292 to update the information stored on the NFS 296 or to provide information to the QFS 292 for use by servers located within the pod 244.

In some implementations, the pod includes one or more database instances 290. The database instance 290 can transmit information to the QFS 292. When information is transmitted to the QFS, it can be available for use by servers within the pod 244 without using an additional database call. In some implementations, database information is transmitted to the indexer 294. Indexer 294 can provide an index of information available in the database 290 or QFS 292. The index information can be provided to file force servers 286 or the QFS 292.

II.A. Policy Enforcement as a Service Overview

Figure 3A:
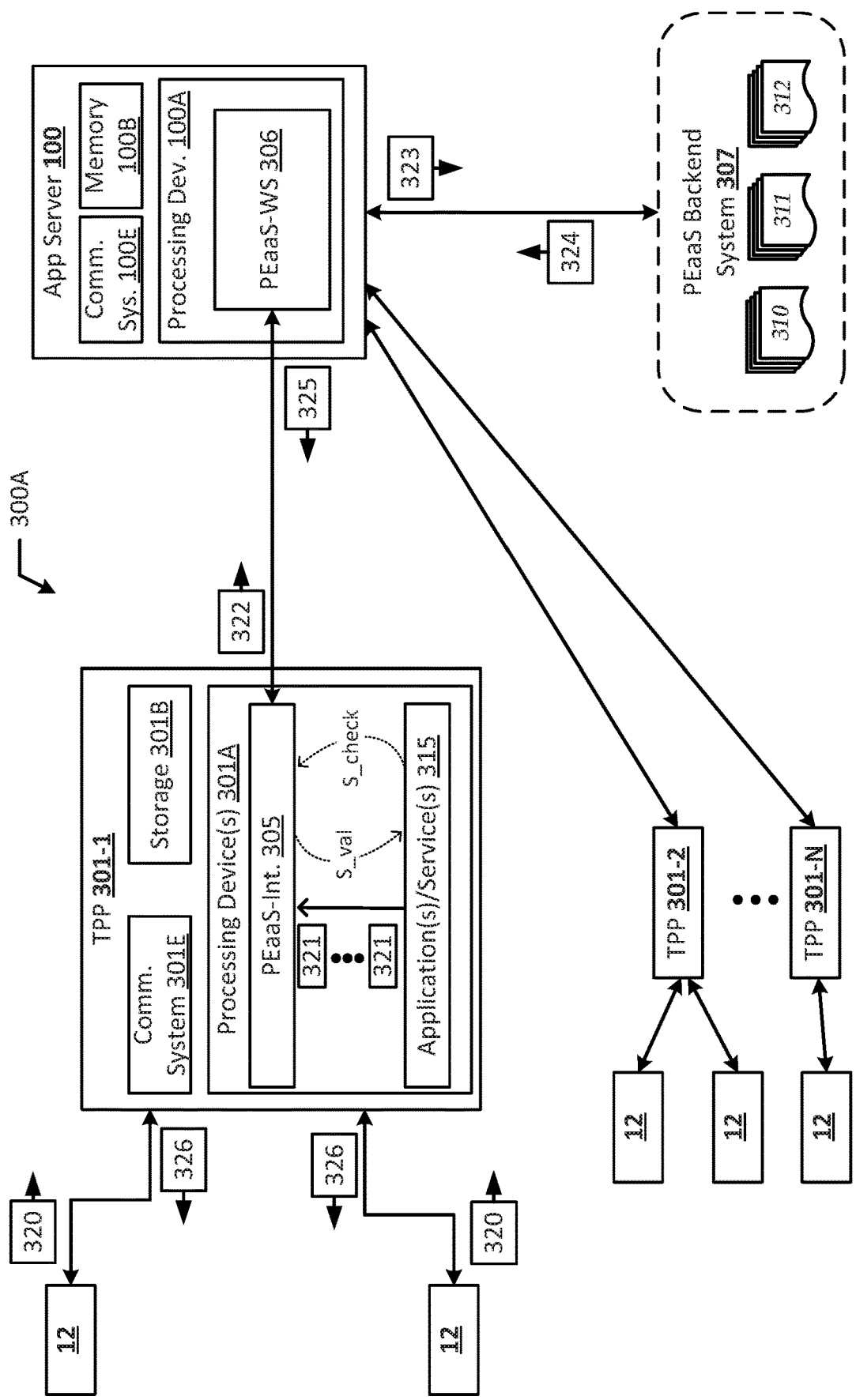
FIG. 3A shows an arrangement in which various embodiments discussed herein may be practiced.

FIG. 3A shows an system 300A in which various embodiments discussed herein may be practiced. In the example of FIG. 3A, various components of the app server 100 (FIGS. 1A-B) may interact with components of a user system 12 and third party platforms (TPPs) 301-1 to 301-N (collectively referred to as "TPPs 301," "TPP 301," or the like). In FIG. 3A, like numbered items are as described with respect to FIGS. 1A-2B (although not all items shown by FIGS. 1A-2B are shown by FIG. 3A). In the example shown by FIG. 3A, a Policy Enforcement as a Service (PEaaS) backend system 307 may interact with a PEaaS Web Service (PEaaS-WS) 306 that is implemented by the app server 100, and the PEaaS-WS 306 may interact with the TPPs 301 via a PEaaS interface 305 that is implemented by the TPPs 301.

In this example, the app server 100 may include processing devices 100A, which may be the same or similar to processor system 17 and/or processor system 12A discussed previously; memory 100B, which may be the same or similar to program code 26 and/or memory system 12B discussed previously; and a communication system 100E, which may be the same or similar to network interface 20 and/or communication system 12E discussed previously. The processing device(s) 100A may be general purpose processors (e.g., any number of general purpose processors) that may be transformed into a special purpose processor to perform any of operations described herein responsive to accessing instructions stored in an electronic memory (e.g., memory 100B or other like memory devices).

In embodiments, the PEaaS backend system (PEaaS-BES) 307 may be implemented by one or more servers, that may be the same or similar to the app servers 100 discussed previously, or may be implemented by one or more of the devices discussed with regard to FIGS. 2A-2B, such as batch server 284, load balancer 228, the app server 100 shown by FIG. 3A, or a different app server 100. In some embodiments, the PEaaS-BES 307 may be implemented as a virtual machine that may be operated by the app server 100 in system 300A (not shown by FIG. 3).

The TPPs 301 may include a plurality of network devices (e.g., various types of servers that may be the same or similar as app servers 100 discussed previously, storage devices, routers, switches, hubs, etc., which may be located in or associated with a data center or data warehouse). The TPPs 301 may include one or more processing devices 301A, storage 301B, and a communication system 301E, each of which may be implemented using circuitry, such as the circuitry discussed herein with regard to FIGS. 1A-2B. The processing device(s) 301A may be general purpose processors (e.g., any number of general purpose processors) to be transformed into a special purpose processor to perform any of operations described herein responsive to accessing instructions stored in an electronic memory (e.g., storage 301B or other like memory devices). The communication system 301E may be the same or similar to the communication system 12E and/or the network interface 20 discussed previously, and may allow the various network devices to communicate with one another and external systems/devices (e.g., app server 100 and user systems 12) via a LAN, fast LAN, message passing interface (MPI), and/or any other suitable networking technology. Additionally, the TPPs 301 and the PEaaS (and also the system 16) may communicate over a public network such as the Internet, or the like. The TPPs 301 may include one or more applications 315, which may provide various services 315 to the user systems 12, such as online news services, social networking services, "big data" search, monitoring and analytics services, cloud computing services, email or messaging services, content (e.g., video and/or audio) streaming services, search engine services, and/or other like services or combinations thereof. In some embodiments, the TPPs 301 may be tenants of the database system 16 discussed previously. Additionally, the TPPs 301 may operate in an enterprise network (e.g., a private network) that is the same or different than an enterprise network (e.g., a private network) in which the system 16 operates.

The PEaaS-BES 307, PEaaS-WS 306, and the PEaaS interface 305 may be collectively referred to as a "PEaaS" or the like. The PEaaS may provide a resource-protection service for distributed software systems (e.g., TPPs 301). The PEaaS may allow TPPs 301 to apply policies to enforce usage restrictions across their respective distributed systems, and may prevent or reduce the likelihood that user systems 12 from overloading those systems. Any TPP 301 that desires usage auditing and service protection in the pursuit of high availability can leverage the PEaaS. In some embodiments, the PEaaS may be implemented or provided by the database system 16, while in other embodiments, the PEaaS may be provided as a standalone service that is separate from the database system 16.

As shown by FIG. 3A, the TPPs 301 may receive user requests 320 from various user systems 12. The TPPs 301 may be customers of the PEaaS and/or database system 16 (e.g., a tenant/organization (org) or app developers associated with the tenants/orgs) that may develop applications 315 that interact and/or integrate with the database system 16 and utilize data from an associated tenant space in tenant DB 22. The user requests 320 may include queries and/or resource addresses (e.g., universal resource locators (URLs)) for accessing tenant data and/or obtaining services provided by applications 315 (also referred to as "service(s) 315" or the like). The user requests 320 may be any suitable message format/type, such as those discussed herein.

Typically, the application 315 may send a request 322 to the app server 100 for the user requested data/resources, and in response, the app server 100 may provide a response message 325, which may include authorization values, user/TPP requested data, error codes (e.g., if access is denied or if the data/resources are not found), or the like. The TPP 301 may then provide another response message 326 to the user system 12, which may include the data re-formatted/re-packaged for consumption by the user system 12. However, issues may arise when one or more user systems 12 send a relatively large amount of user requests 320 over a relatively short period of time, or send multiple user requests 320 with oversized payloads. When a TPP 301 is flooded with numerous or voluminous user requests 320, the TPP 301 may become overload, which may prevent some or all other user requests 320 from being fulfilled.

According to various embodiments, each TPP 301 may utilize the PEaaS to enforce policies 310 on their behalf. The PEaaS is responsible for tracking usage metrics 311 and user infractions 312 and issuing user suspensions based on various policies 310. In embodiments, the TPPs 301 may define a policy 310 for one or more of the services, which are used by the PEaaS to issue infractions 312 and/or suspensions. Once defined, the policies 310 may be passed to the PEaaS-WS 306 in a message 322 through the PEaaS interface 305. The PEaaS-WS 306 may provide the policies 310 to the PEaaS-BES 307 in a message 323.

In embodiments, as user requests 320 are received by a service 315, user and service parameters 321 may be provided or "streamed" from the service 315 to the PEaaS interface 305. The user and service parameters 321 may include various data associated with a user that sent a particular user request 320 and various data associated with a requested service 315. For example, the parameters 321 may include information extracted or derived from the user requests 320, such as query parameters, resource addresses, user identification information (e.g., user_id of a user system 12, client_id of a user that uses the user system 12, a user agent string, IP address of the user system 12, time and date that the user request 320 was sent, and/or other user or user system 12 related information). This information may be extracted from a header and/or body portion of an HTTP message conveying the user request 320 using known techniques. In addition to (or alternative to) obtaining information from the user request 320 itself, other types of user information associated with the user systems 12 may be determined or derived. For example, a time zone or geolocation in which a user system 12 is located may be derived from an obtained IP address. In some embodiments, the other types of user information may be sent to the TPP 301 when a user system 12 loads or renders a client-side application or web page for accessing the services of the TPP 301. For example, the client-side application or web page may include JavaScript or other like code that obtains and sends back information (e.g., in an additional HTTP message(s)) that is not typically included in an HTTP header, such as time zone information, global positioning system (GPS) coordinates, cookie data stored at the user system 12, screen or display resolution of the user system 12, and/or other like information. Other methods may be used to obtain or derive user information.

Furthermore, in some embodiments, the parameters 321 may also include service or TPP 301 related information, which may be used to identify the appropriate policy 301 for that service or TPP 301. This information may include, for example, a TPP 301 or service identifier such as the values of the service or subsystem components discussed with regard to table 1 infra, or other like information. In other embodiments, the particular service or TPP 301 may be identified by the PEaaS-WS 306 or the PEaaS-BES 307 based on the user/service parameters 321. Regardless of the specific type of user/service information and/or how the user/service information is obtained, the user/service parameters 321 may be passed to the PEaaS-WS 306 via the PEaaS interface 305 so that the PEaaS-BES 307 may monitor the usage of the TPP 301 services. The particular type of user/service information that is collected and monitored by the PEaaS may be service or platform specific, or may be specific to the policy 310 parameters defined by the TPPs 301.

The PEaSS interface 305 may provide the parameters 321 to the PEaaS-WS 306 in a message 322, and when received by the PEaaS-WS 306, the PEaaS-WS 306 may provide the parameters 321 to the PEaaS-BES 307 in a message 323. The parameters 321 may be stored as usage metrics 311 by the PEaaS-BES 307. The PEaaS may use the usage metrics 311 per service to evaluate infractions 312 and suspensions. As discussed in more detail infra, the usage metrics 311 may be used for generating infraction records 312 (also referred to as "infractions 312," "infraction object 312," or the like), and the infraction records 312 may be used to determine whether a user should be suspended or not.

Referring back to the TPP 301-1, at predetermined or desired intervals, the application(s) 315 may perform a suspension check (e.g., "s_check" in FIG. 3A), which may involve the application(s) 315 polling for or otherwise requesting user suspensions from the PEaaS. The s_check may be conveyed to the PEaaS-WS 306 via the PEaaS interface 305 in a message 322, and may be conveyed to the PEaaS-BES 307 by the PEaaS-WS 306 in a message 323. The PEaaS-WS 306 may provide a set or list of suspended users to the PEaaS-WS 306 in a message 324, which may then be passed to the TPP 301 in a message 325 via the PEaaS interface 305. The set or list of suspended users in the message 325 may include a suspension value for each suspended user (e.g., "s val" in FIG. 3A). In some embodiments, the suspension value may correspond to a suspension level, which is discussed in more detail infra. The application(s) 315 may include code that identifies the suspended users from the message 325 and suspends or otherwise prevents the identified users from accessing the relevant service(s). In some embodiments, the application(s) 315 may convey the suspension to the appropriate user systems 12 in a response message 326 (which may be referred to as a "suspension message 326s," "suspension 326s," or the like). When a requesting user has not been suspended (e.g., is not indicated by the message 325), the application(s) 315 may convey the appropriate response to the appropriate user systems 12 in a response message 326 (which may be referred to as a "response message 326r," "response 326r," or the like).

In the example shown by FIG. 3A, the parameters, metrics, instructions/commands, information, etc. communicated between the various elements of the system 300A are conveyed using various messages 320-326. It should be understood that the numerical labeling of the messages is used to differentiate the messages from one another and should not be construed as denoting order, priority, importance, etc. In various embodiments, messages 320-326 may be in the form of any suitable language/format, such as those discussed herein, a proprietary message format used by the PEaaS, and/or the like or combinations thereof. Furthermore, the messages 320-326 may be communicated using any suitable communication protocol, such as those discussed herein, a proprietary protocol used for conveying messages between various elements (e.g., TPPs 301, app server(s) 100, and/or backend system 307), and/or the like or combinations thereof.

II.B. Policy Definitions

A TPP 301 may define one or more policies 310 that specify a threshold number of user requests 320, threshold user request 320 size, number/size of queries, number/size of resource accesses, etc., that their users are allowed to send in defined period of time. The TPPs 301 may define a single policy 310 that covers an entirety of their platform/service, or the TPPs 301 may define individual policies 310 for individual applications, platforms, or services that they provide. In some embodiments, a TPP 301 may define one or more policies 310 during a registration or signup procedure, or when a TPP 301 implements a respective PEaaS interface 305 (discussed infra).

A policy 310 may by an entity, such as a database object or other like data structure, that encapsulates information used by the PEaaS to perform enforcement. A policy 310 may be a collection or set of policy parameters (or "components") each of which comprises a policy parameter value; the term "policy parameter values" may refer to various values that define a specified policy 310 against which the usage metrics 311 are checked. The policy 310 may be in any suitable format, such as HTML, XML, JSON, or some other suitable format. Example components for an policy object/entity are shown by table 1, and an example structure of a policy object/entity is shown by table 2.

TABLE 1 example policy components

| Component | Type | Description |
| --- | --- | --- |
| id | bigint | Identifier of the policy object; may be generated based on the "service" and "name" components |
| createdById | bigint | Identifier of the principal who created the policy |
| createdDate | long | Timestamp when the policy was created |
| modifiedById | string | Identifier of the principal who last modified the policy |
| modifiedDate | string | Timestamp when the policy was last modified |
| service | string, bigint | a service associated with this policy; may be a primary key |
| name | string | name of the policy; may be a primary key |
| owner | string[ ], list | unique names of the owners who own the policy |
| subsystem | string | a sub-system to which the policy applies |
| triggerType | string | A trigger type that is associated with the policy. The trigger type may be a comparator to be used with the threshold(s) for the policy. Trigger types may include: |

TABLE 1-continued example policy components

| Component | Type | Description |
|---|---|---|
| | | GREATER_THAN | GREATER_THAN_OR_EQ | LESS_THAN | LESS_THAN_OR_EQ | EQUAL NOT_EQUAL | BETWEEN | NOT_BETWEEN |
| aggregator | string | Aggregator to be used to aggregate data points across different time series for usage metrics associated with the policy. The aggregator may be used for evaluating infractions. Aggregators may include: sum | zsum (zero-padded sum) | min | max | dev (standard deviation) | avg |
| thresholds | double[ ], list | Threshold value(s) for the policy; may be a list of threshold values. Should have length 1 if TriggerType is a 2-element comparator (e.g., LESS_THAN), otherwise should have length 2 if TriggerType is a 3-element comparator (e.g., BETWEEN) |
| timeUnit | string | Indicates the time unit for evaluating usage metrics. Format may be a positive integer followed by one of: d (days) | h (hours) | m (minutes) | s (seconds) |
| defaultValue | double | default value for metric value(s) |
| cronEntry | string | Time and frequency for alert evaluation in CRON format |
| suspensionLevels | string[ ], List | List of suspension levels; each listed suspension level may have at least the following fields: levelNumber, infractionCount, suspensionTime |

TABLE 2 example policy entity

```
{
"aggregator":"AVG",
"createdById":1,
"createdDate":1472847819167,
"cronEntry":"*/5 * * * *",
"defaultValue":0.0,
"id":1,
"modifiedById":10,
"modifiedDate":1472847819167,
"name":"TestName",
"owners":[
"TestOwner"
],
"service":"TestService",
"subSystem":"TestSubSystem",
"suspensionLevels":[
 {
  "createdById":1,
  "createdDate":1472847819167,
  "id":1,
  "infractionCount":1,
  "levelNumber":1,
  "modifiedById":10,
  "modifiedDate":1472847819167,
  "policyId":1,
  "suspensionTime":3600000
 },
 {
  "createdById":1,
  "createdDate":1472847819167,
  "id":1,
  "infractionCount":2,
  "levelNumber":2,
  "modifiedById":10,
  "modifiedDate":1472847819167,
  "policyId":1,
  "suspensionTime":7200000
 }
],
"thresholds":[
 0,100
],
"timeUnit":"1h",
"triggerType":"BETWEEN",
}
```

As shown by table 1, a policy 310 may indicate, inter alia, one or more thresholds (e.g., "thresholds"), one or more triggers (e.g., "triggerType"), an aggregator (e.g., "aggregator"), an evaluation frequency (e.g., "cronEntry"), and one or more suspensions levels (e.g., "suspensionLevels"). In the example of table 2, an infraction 312 may be triggered or issued if the mean (e.g., "aggregator": "AVG") over 1 hour (e.g., "timeUnit": "1 h") is between 0 and 100 (e.g., "thresholds": [0,100), where infractions 312 are checked every 5 minutes (e.g., "cronEntry": "*/5 * * * *"). In this example, a user is suspended for 3600 seconds or 60 minutes (e.g., "suspensionTime": 3600000 under suspension level 1) after 1 infraction is detected (e.g., "infractionCount": 1 under suspension level 1), and a user is suspended for 7200 seconds or 120 minutes (e.g., e.g., "suspensionTime": 7200000 under suspension level 2) after 2 infractions are detected (e.g., "infractionCount": 2 under suspension level 2).

The usage metrics (or "metrics") may be any identifiable or measureable event associated with use of a service provided by a TPP 301. Examples of such metrics may include receipt of a user request 320; a payload size of a user request 320; a query size or type; a request to access a particular resource, perform a particular input/output (I/O) operation, access a database object, etc.; processor time or utilization, and/or the like. The TPP 301 may also define a scope for measuring metrics, which may identify a categorization of where the metrics originate (e.g., individual user systems 12 or the like); and a set of tags or key-value pairs to associate various attributes to the metric. Example fields for an metric object/entity are shown by table 3, and an example structure of a metric object/entity is shown by table 4.

TABLE 3 example metric fields

| Fields | Type | Description |
|---|---|---|
| scope | string | Scope of the metric object |
| metric | string | Name of the time-series metric |
| Tags | map<string, string> | Additional information in the form of a key-value pair |
| namespace | string | Name space for the metric |
| datapoints | map<long, string> | Timestamps and corresponding metric values |

TABLE 4 example metric entity

```
{
    "scope": "argus.jvm",
    "metric": "file.descriptor.open",
    "tags": {
    "host": "perfeng-tools4-1-sfm.ops.abcd.net"
    },
    "namespace": null,
    "datapoints": {
    1446850980000: "171.0",
    1446851040000: "174.0",
    }
}
```

The evaluation frequency may indicate a period of time or interval that the PEaaS is evaluate the metric to determine whether infractions 312 have occurred. The threshold value may represent a upper limit or maximum number that is compared to the indicated metric. An aggregator may be used to combine multiple metrics for evaluation, for example, an aggregator may be an average, sum, etc. A trigger may be a comparison operator used to compare a threshold with the indicated metric, for example, trigger types may include less than, greater than, equal to, etc. When the trigger condition is met, an infraction record 312 may be generated and/or a suspension may be issued.

An infraction 312 may refer the act or event of violating a policy 310, as well as a record or database object that stores information about the violation. An infraction object/entity 312 may encapsulate information used by the PEaaS to track infraction history for one or more users. Example fields for an infraction object/entity 312 are shown by table 5, and an example structure of an infraction object/entity 312 is shown by table 6.

TABLE 5 example infraction fields

| Fields | Type | Description |
| --- | --- | --- |
| id | bigint | Identifier of the infraction object |
| createdById | bigint | Identifier of the principal who created the infraction |
| createdDate | long | Timestamp when the infraction was created |
| modifiedById | Bigint | Identifier of the principal who last modified the infraction |
| modifiedDate | long | Timestamp when the infraction was last modified |
| policyId | long | Identifier of the policy associated with the infraction |
| user | string | User name of the policy |
| incurred | long | Time when the infraction occurred |
| expires | long | Time when suspension expires. The value "0" indicates no suspension and "−1" indicates indefinite suspension |

TABLE 6 example infraction entity

```
{
    "id": 100868,
    "createdById": 1,
    "createdDate": 1422483200579,
    "modifiedById": 1,
    "modifiedDate": 1444405128804,
    "user":user1,
    "incurred":100000,
```

TABLE 6-continued example infraction entity

```
    "policyId":1,
    "expires":−1
}
```

A suspension is a type of infraction 312 that blocks a user from a protected service. Suspensions may have an expiration time, where a user may be automatically reinstated to use a service once the suspension time expires. Suspension/infraction entities that do not have an explicit expiration time may be considered indefinite suspensions, where a user is not reinstated to use the service. Indefinite suspensions may require the TPP 301 to actively reinstate the user. When an indefinite suspension is cleared, the reinstatement time may be set to the current time and the infraction 312 may remain part of the user's history until that time it is no longer needed for policy evaluation. In embodiments, TPPs 301 may manually suspend or reinstate users. In some implementations, the PEaaS may provide a suspension notification in the form of an event for when a policy is violated, and the code of the TPP 301 may take an appropriate action upon receiving the notification. The actual suspension of users and the actual reinstatement of users are performed by the TPP 301 that calls the PEaaS. The process of managing infractions 312 and suspensions can be done by making an appropriate API (discussed infra). In some implementations, the TPP 301 may indicate to the PEaaS that a user has actually been suspended or reinstated via the infraction API. If a user attempts to access a service of a TPP 301 after the user has been suspended, the PEaaS may return an error message 325 including all the information about the suspension and associated policy 310.

A TPP 301 may also specify one or more suspension levels with individual infraction counts to be associated with their policies 310. A suspension level may define a period of time that a user is to be suspended for a certain number of infractions 312 per evaluation period. For example, a first suspension level may be defined to suspend a user for 30 seconds when the user commits one infraction 312 during an evaluation period, and a second suspension may be defined to suspend a user for 2 minutes when the user commits 10 infractions 312 during the evaluation period. A suspension level object may encapsulate information defined by the TPP 301 for an individual suspension level. The PEaaS may use the defined suspension levels to determine how long to suspend a user based on the user's infraction count. Example fields for a suspension level object/entity are shown by table 7, and an example structure of a suspension level object/entity is shown by table 8.

TABLE 7 example suspension level fields

| Fields | Type | Description |
| --- | --- | --- |
| id | bigint | Identifier of the suspension level object. |
| createdById | bigint | Identifier of the principal who created the suspension level. |
| createdDate | long | Timestamp when the suspension level was created. |
| modifiedById | bigint | Identifier of the principal who last modified the suspension level. |
| modifiedDate | long | Timestamp when the suspension level was last modified. |
| policyId | long | Identifier of the policy associated with the suspension level. |

TABLE 7-continued example suspension level fields

| Fields | Type | Description |
|---|---|---|
| levelNumber | int | The level number associated with the suspension level. |
| infractionCount | int | The number of infractions needed to be suspended according to the suspension level. |
| suspensionTime | long | Amount of time for suspending a user for the suspension level (in milliseconds). |

TABLE 8 example suspension level entity

```
{
  "id": 100868,
  "createdById": 1,
  "createdDate": 1422483200579,
  "modifiedById": 1,
  "modifiedDate": 1444405128804,
  "infractionCount":1,
  "levelNumber":1,
  "policyId":1,
  "suspensionTime":3600000
}
```

In some implementations, the PEaaS may provide a dev-environment that may allow TPPs 301 (or associated app developers) to define multiple policies 310 that the PEaaS may accept via API requests. For example, the dev-environment may provide a GUI with multiple graphical control elements that allows an owner/operator, developer, etc. of a TPP 301 to input various policy parameters, infraction parameters, suspension level parameters, etc., which when submitted to the PEaaS, may generate a policy 310 in a suitable format (e.g., XML, JSON, etc.). In addition, the dev-environment may also allow the TPPs 301/developers to build dashboards or other like visualization frameworks for rendering visual representation of monitored metrics 311 and/or infraction 312/suspension statuses.

The process of defining a policy 310, metrics 311, infractions 312, suspension levels, etc. with the PEaaS may be done by calling a PEaaS API. The PEaaS API may be a Representational State Transfer (REST or RESTful) API, Simple Object Access Protocol (SOAP) API, Apex API, and/or some other like API. In one example, the PEaaS API may be a RESTful API, where a POST request may be issued to a PEaaS-WS 306 endpoint with a JSON payload describing the policy data to be written. In this case, a policy 310 is created by the PEaaS-WS 306 using the policy data, and then pushed to the PEaaS backend system 307 (see e.g., FIG. 3E). The PEaaS backend system 307 uses the policy 310 to generate a metric expression, trigger, and alert (e.g., suspension or infraction record 312) to evaluate and monitor user usage data. The PEaaS backend system 307 may also use the CRON entry indicated by the policy 310 to schedule an alert for unexpected user usage data, where the CRON entry represents the evaluation frequency.

Infraction 312, suspension, and reinstatement management may also be accomplished using the PEaaS API. As an example, table 9 shows examples methods for querying policy and infraction data associated with a specific user and for managing suspensions when the PEaaS is implemented as a RESTful API.

TABLE 9 example methods for querying user resources

| Endpoint | Method | Description |
|---|---|---|
| /user | GET | Returns users for which the remote user is authorized to retrieve. |
| /{username} | GET | Returns a user having the given username. |
| /user/{username}/policy | GET | Returns policies for the given username. |
| /user/{username}/policy/{policyId}/metric?start=−31d&end=−2d | GET | Returns metrics for the given username and policy ID, start time and end time are optional, the default value for start is −30 d, the default value for end is current timestamp. |
| /user/{username}/policy/{policyId}/infraction | GET | Returns infractions for the given username and policy ID. |
| /user/{username}/infraction | GET | Returns infractions for the given username. |
| /user/{username}/infraction/{infractionId} | GET | Returns an infraction for the given username. |
| /user/{username}/suspension | GET | Returns suspensions for the given username. |
| /user/{username}/suspension/{suspensionId} | GET | Returns a suspension for the given username. |
| /auth/login | POST | Authenticates user |
| /auth/logout | GET | Terminates user |
| /management/privilege | PUT | Grants administrative privileges |
| /policy | POST | Create policies |
| /policy | PUT | Update policies. |
| /policy?username={username}&pid={pid}&service={service}&name={name} | GET | Returns all policies, query parameters are optional. Query parameters include user name ("username"), policy ID ("policyId"), service name ("service"), and policy name ("name") |
| /policy?id={policyId_1}&id={policyId_2} | DELETE | Delete policies by specifying policy ids |
| /policy/{pid} | GET | Returns a policy by specifying its ID |
| /policy/{pid} | DELETE | Deletes a policy and its suspension levels by specifying its ID |
| /policy/{pid} | PUT | Updates a policy by specifying its ID |
| /policy/{pid}/level | POST | Creates new suspension levels for the given policy ID |
| /policy/{pid}/level | PUT | Update all suspension levels for the given policy ID |
| /policy/{pid}/level?id={levelId} | GET | Returns all suspension levels for the given policy ID, level id is optional |
| /policy/{pid}/level?lid={levelId} | DELETE | Deletes suspension levels for the given policy ID, level id is optional |

TABLE 9-continued example methods for querying user resources

| Endpoint | Method | Description |
|---|---|---|
| /policy/{pid}/level/{levelId} | GET | Returns a suspension level for a policy by specifying its ID |
| /policy/{pid}/level/{levelId} | DELETE | Deletes a suspension level for a policy by specifying its ID |
| /policy/{pid}/level/{levelId} | PUT | Updates a suspension level for a policy by specifying its ID |
| /policy/{pid}/infraction?iid={infractionId}&username={username} | GET | Returns infractions for the given policy ID |
| /policy/{pid}/infraction/{iid} | GET | Return suspensions for the given policy ID and username, suspensionId is optional |
| /policy/{pid}/user/{username}/suspension?sid={suspensionId} | DELETE | Delete suspensions for the given policy ID and username, suspensionId is optional |
| /policy/{pid}/suspension | GET | Return suspensions for the given policy ID |
| /policy/{pid}/suspension?id={suspensionId} | DELETE | Delete suspensions for the given policy ID, suspensionId is optional. Can be used to reinstate users" (after "suspensionId is optional") |
| /policy/{pid}/user/{username}/metric/{value} | POST | Submits external collected metric data for the given policy ID and username |
| /policy/{pid}/user/{username}/metric?start={startTime}&end={endTime} | GET | Returns the metric for the given policy ID and username, start time and end time are optional. |
| /policy/{pid}/user/{username}/suspension | POST | Creates an indefinite suspension for the given user under the given policy |

II.C. PEaaS Interfaces

In embodiments, before or concurrently with defining a policy 310, the TPP 301 may implement a PEaaS interface 305 in order to utilize the PEaaS. The PEaaS interface 305 may be a mechanism that a TPP 301 may use to implement PEaaS into their platforms or applications/services 315. A TPP 301 may access the PEaaS using one of three different interfaces: a PEaaS Agent (see e.g., FIG. 3B), PEaaS Filter (see e.g., FIG. 3C), or a PEaaS Proxy (see e.g., FIG. 3D).

Figure 3C:
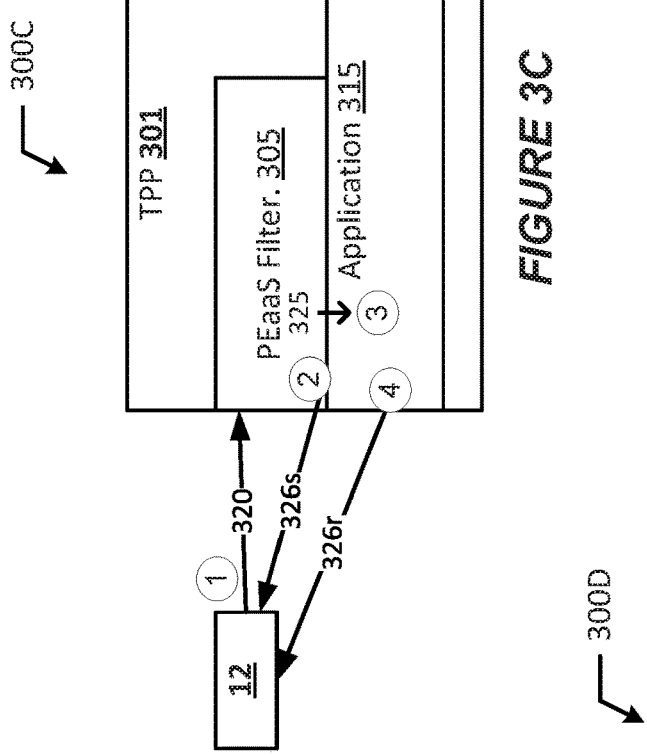
FIGS. 3B-3D show example Policy Enforcement as a Service (PEaaS) interfaces, in accordance with various embodiments.
Figure 3B:
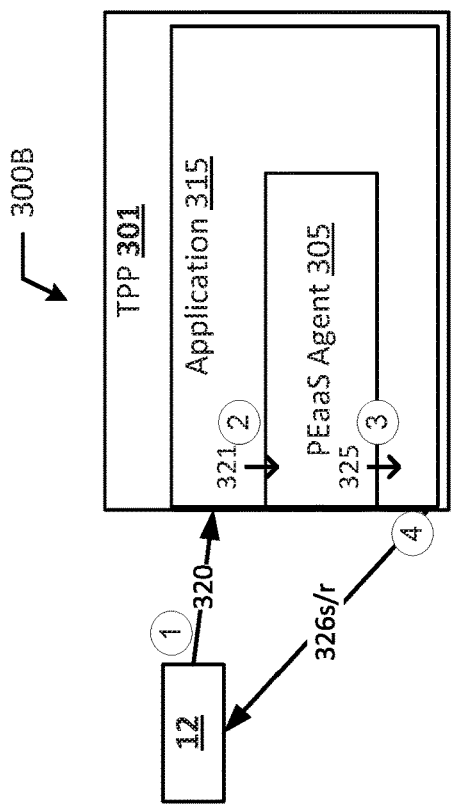

Referring to FIG. 3B, a first example interface arrangement 300B is shown. This arrangement includes a PEaaS Agent 305 (or PEaaS SDK), which may be an instrumented agent that is embedded within the application 315 or code base of the TPP 301. An example implementation of the PEaaS Agent 305 is shown by table 10.

TABLE 10 example PEaaS Agent 305

```
int maxConnections = 100;
try (
    peaasService service = peaasService.getInstance(
    "https://peaas.mycompany.com/peaas-ws",
    maxConnections);
) {
    DefaultPEaaSClient client = new
    DefaultPEaaSClient(peaasService,
"aUsername", "aPassword");
    Policy result = new Policy( );
    policy.setService("TestService");
    policy.setName("TestName");
    policy.setOwners(Arrays.asList("TestOwner"));
    policy.setUsers(Arrays.asList("TestUser"));
    policy.setSubSystem("TestSubSystem");
    policy.setTriggerType(Policy.TriggerType.BETWEEN);
    policy.setAggregator(Policy.Aggregator.AVG);
    policy.setThresholds(Arrays.asList(0.0));
    policy.setTimeUnit("5min");
    policy.setDefaultvalue(0.0);
    policy.setCronEntry("0 */4 * * *");
    client.register(Arrays.asList(new Policy[ ] { policy }));
    client.updateMetric(policy, "TestUser", 1.0);
    Thread.currentThread( ).sleep(45000);
    client.unregister( );
}
```

In these implementations, a user request 320 may be sent to the TPP 301 application 315 (node 1), which is then captured by the PEaaS Agent 305 as user/service parameters 321 (node 2). The PEaaS Agent 305 may then provide the parameters 321 to the PEaaS backend 307 (not shown by FIG. 3B) and may obtain a response 325, which is then provided to the application 315 (node 3). The application 315 may then provide an appropriate response 326s/r to the user system 12 (node 4). In a first example, the response 325 provided by the PEaaS Agent 305 to the application 315 (node 3) may indicate or include a user_id or client_id in a set of suspended users, and the application 315 may then send a suspension response 326s to the user system 12 (node 4). In a second example, the response 325 provided by the PEaaS Agent 305 to the application 315 (node 3) may not indicate or include a user_id or client_id in a set of suspended users, and the application 315 may then send a typical response 326r to the user system 12 (node 4) according to the user request 320.

Referring to FIG. 3C, a second example interface arrangement 300C is shown. This arrangement includes a PEaaS Filter 305, which may be a web filter that may be used by various applications 315. The TPP 301 may configure the application(s) 315 to use the PEaaS Filter 305 so that the filter runs within an individual service (e.g., provided by application 315). Such an implementation may be used where the application(s) 315 are servlet based applications. In some implementations, the PEaaS Filter 305 may encapsulate the PEaaS SDK, where the PEaaS Filter 305 is written on top of PEaaS SDK code. An example implementation of a configuration and definition of the PEaaS Filter 305 is shown by tables 11 and 12, where table 11 shows an example policy definition for the PEaaS Filter 305 and table 12 shows an example PEaaS Filter 305 configuration.

TABLE 11 example PEaaS Filter 305 policy definition

```
{
    "policies": [
    {
    "url": "url_1",
    "verb": "verb_1",
    "service": "service_1",
    "name": "name_1",
```

TABLE 11-continued example PEaaS Filter 305 policy definition

```
"owners": ["owner_1.1","owner_1.2"],
"users": ["user_1.1","user_1.2"],
"subSystem": "subSystem_1",
"triggerType": "triggerType_1",
"aggregator": "aggregator_1",
"threshold": ["threshold_1.1","threshold_1.2"],
"timeUnit": "timeUnit_1",
"defaultValue": "defaultValue_1",
"cronEntry": "cronEntry_1",
"levels": [
    {
        "levelNumber": "levelNumber_1.1",
        "infractionCount": "infractionCount_1.1",
        "suspensionTime": "suspensionTime_1.1"
    },
    {
        "levelNumber": "levelNumber_1.2",
        "infractionCount": "infractionCount_1.2",
        "suspensionTime": "suspensionTime_1.2"
    }
]
},
{
"url": "url_2",
"verb": "verb_2",
"service": "service_2",
"name": "name_2",
"owners": ["owner_2.1","owner_2.2"],
"users": ["user_2.1","user_2.2"],
"subSystem": "subSystem_2",
"triggerType": "triggerType_2",
"aggregator": "aggregator_2",
"threshold": ["threshold_2.1","threshold_2.2"],
"timeUnit": "timeUnit_2",
"defaultValue": "defaultValue_2",
"cronEntry": "cronEntry_2",
"levels": [
    {
        "levelNumber": "levelNumber_2.1",
        "infractionCount": "infractionCount_2.1",
        "suspensionTime": "suspensionTime_2.1"
    },
    {
        "levelNumber": "levelNumber_2.2",
        "infractionCount": "infractionCount_2.2",
        "suspensionTime": "suspensionTime_2.2"
    }
]
},
{
"url": "url_3",
"verb": "verb_3",
"service": "service_3",
"name": "name_3",
"owners": ["owner_3.1","owner_3.2"],
"users": ["user_3.1","user_3.2"],
"subSystem": "subSystem_3",
"triggerType": "triggerType_3",
"aggregator": "aggregator_3",
"threshold": ["threshold_3.1","threshold_3.2"],
"timeUnit": "timeUnit_3",
"defaultValue": "defaultValue_3",
"cronEntry": "cronEntry_3",
"levels": [
    {
        "levelNumber": "levelNumber_3.1",
        "infractionCount": "infractionCount_3.1",
        "suspensionTime": "suspensionTime_3.1"
    },
    {
        "levelNumber": "levelNumber_3.2",
        "infractionCount": "infractionCount_3.2",
        "suspensionTime": "suspensionTime_3.2"
    }
]
}
]
}
```

TABLE 12 example PEaaS Filter 305 configuration

```
<filter>
    <filter-name>PEaaSFilter</filter-name>
    <filter-class>PEaaSFilter</filter-class>
    <init-param>
        <param-name>endpoint</param-name>
        <param-value>https://localhost:8080/peaasws</param-value>
    </init-param>
    <init-param>
        <param-name>username</param-name>
        <param-value>pilotUser</param-value>
    </init-param>
    <init-param>
        <param-name>password</param-name>
        <param-value>pilotPwd</param-value>
    </init-param>
    <init-param>
        <param-name>json_location</param-name>
        <param-value>https://localhost:1314/policyDef_example.json</param-value>
    </init-param>
</filter>
<filter-mapping>
    <filter-name>PEaaSFilter</filter-name>
    <url-pattern>/*</url-pattern>
</filter-mapping>
```

The PEaaS Filter 305 may operate by obtaining and reading user requests 320 before any other component in the application(s)/service(s) 315 (node 1), and may provide parameters 321 to the PEaaS backend 307 (not shown by FIG. 3C). The PEaaS Filter 305 may obtain a response 325, and if the response 325 indicates that the user is suspended, the PEaaS Filter 305 may send a suspension response 326s to the user system 12 (node 2). Otherwise, the PEaaS Filter 305 may provide an appropriate indication to the application/service 315 in response 325 (node 3), and the application/service 315 may send an appropriate response 326r to the user system 12 (node 4).

Figure 3D:
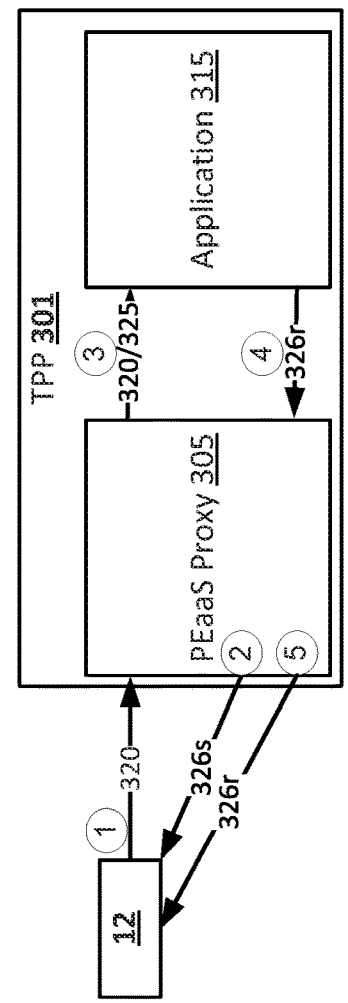

Referring to FIG. 3D, a third example interface arrangement 300D is shown. This arrangement includes a PEaaS Proxy 305, which may be an interface that runs as a separate web service/application for various applications/services 315. Such an implementation may be used for non-Java and/or "black box" services/applications 315. Similar to the PEaaS Filter 305, the PEaaS Proxy 305 may also encapsulate the PEaaS SDK. In various implementations, the TPP 301 may deploy the PEaaS Proxy 305 on the same host/server as the application(s) 315 or in a content delivery server employed by the TPP 301. This may be achieved by downloading and installing an application package of the PEaaS Proxy 305, or by inserting a web resource for the PEaaS Proxy 305 into the application 315 code base.

The PEaaS Proxy 305 may operate by obtaining a user request 320 from a user system 12 (node 1), and may provide parameters 321 to the PEaaS backend 307 (not shown by FIG. 3D). The PEaaS Proxy 305 may obtain a response 325 and may respond to the user system 12 with a suspension response 326r, if necessary (node 2). Otherwise, the PEaaS Proxy 305 may forward the user request 320 (or include the content of the user request 320 in a response 325) to the application 315 for processing (node 3), may obtain an appropriate user response 326r from the application 315 (node 4), and may forward the user response 326r to the user system 12 (node 5).

II.D. PEaaS Backend System Overview

Figure 3E:
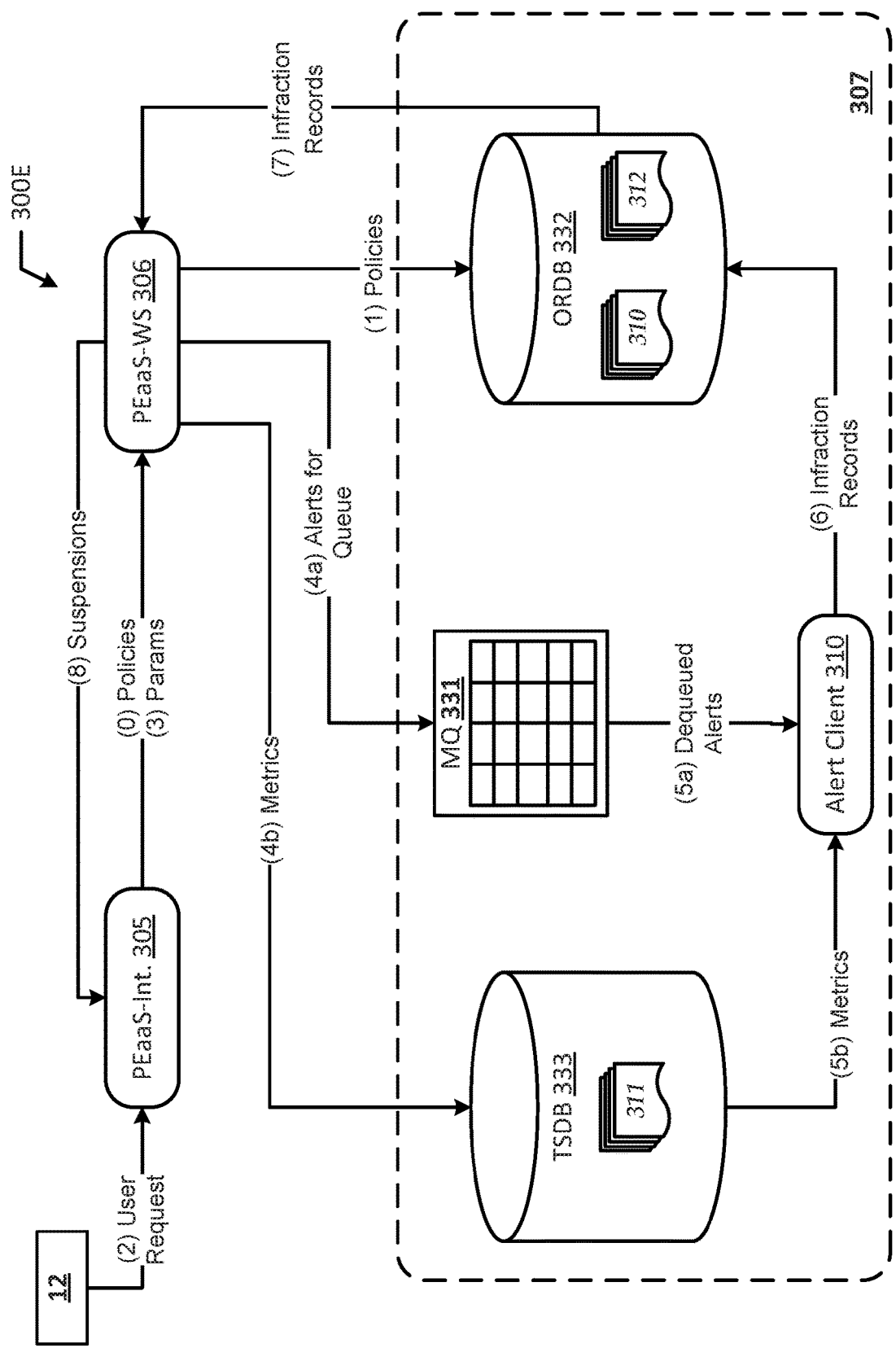
FIG. 3E shows an example PEaaS backend system, in accordance with various embodiments.

FIG. 3E shows a system 300E in which various embodiments discussed herein may be practiced. FIG. 3E shows the logical interactions between various elements of the PEaaS-BES 307 and other elements as discussed previously. In FIG. 3E, like numbered items are as described with respect to FIGS. 1A-3D (although not all items shown by FIGS. 1A-3D are shown by FIG. 3E). In the example shown by FIG. 3E, the PEaaS-BES 307 may include a message queue (MQ) 331, an alert client 310, an object-relational database (ORDB) 332, and a time series database (TSDB). The entities of system 300E may operate as follows.

At operation 0, a TPP 301 may define one or more policies 310, which may be conveyed to the PEaaS-WS 306 via the PEaaS interface 305. At operation 1, the PEaaS-WS 306 may push the policies 310 to the ORDB 322 for storage. In embodiments, operations related to operations 0 and 1 may be performed continuously or repeated as policies 310 are updated for existing services or newly defined for new services to be provided by the TPP 301.

At operation 2, user requests 320 may be sent to an application/service 315 of a TPP 301, which implements the PEaaS interface 305. At operation 3, user/service parameters 321 may be conveyed to the PEaaS interface 305 according to the particular type of interface that is implemented (see e.g., FIGS. 3B-3D), and the PEaaS interface 305 may provide the usage metrics or parameters 321 to the PEaaS-WS 306. In this way, the PEaaS-WS 306 may act as an entry point for TPPs 301 and main communicator for the storage entities (e.g., MQ 331, ORDB 332, TSDB 333).

At operation 4a, the PEaaS-WS 306 may create/update and store alerts in the MQ 331 (also referred to as a "message buffer 331" or the like. The MQ 331 may be implemented using any suitable message queue, message broker, enterprise messaging system, or stream processing platform. As an example, the MQ 331 may be implemented as an Apache® Kafka™ queue. When a user system 12 calls a policy-protected endpoint (e.g., at a TPP 301), an alert may be either created or re-activated for an associated policy 310. In various embodiments, the MQ 331 may operate on one or more servers (which may be the same or similar to the other servers discussed herein) and may store streams of records (e.g., the parameters 321) according to various topics or categories. The streams of records may be stored in the TSDB 333 as usage metrics 311 at operation 4b. Each record may comprise a timestamp and an alert. The alerts may be any data structure that indicates a user-policy association or relationship. For example, the alert may be a key-value pair (KVP), an attribute-value pair (AVP), a tuple, or any other suitable data structure (collectively referred to as an "AVP"). Where AVPs or KVPs are used, the alerts may comprise a user_id or client_id as a value of the KVP/AVP and a policy identifier (policy_id) as the key/attribute of the KVP/AVP. The policy_id may be an identifier of the policy 310 defined by the TPP 301 for an individual service provided by the TPP 301. In one example, the policy_id may be one of the "id", "service", or "subsystem" components of table 1. In another example, the policy_id may be generated as a composite primary key based on the service and name components of a policy 310 (see e.g., table 1). In embodiments, the alerts may be stored, queued, or enqueued in the MQ 331 according to a policy 310 defined evaluation frequency (e.g., the cronEntry component of table 1). Additional examples database objects used for alerts and that may be stored in the MQ 331 are discussed infra with regard to FIGS. 8-9.

At operation 5a, the alert client 310 may dequeue the enqueued alerts for evaluation, and at operation 5b the alert client 310 may obtain the usage metrics 311 for the evaluation. In embodiments, the alerts may be dequeued and evaluated according to the evaluation frequency as defined by its associated policy 310. In a first example, when a policy 310 includes a cronEntry component having a value of "0 */4 * * * *", the alert client 310 may evaluate each queued alert every four hours (e.g., at every $0^{th}$ minute past every $4^{th}$ hour). In a second example, when a policy 310 includes a cronEntry component having a value of "1-59/2 * * * * *", the alert client 310 may evaluate each queued alert every uneven minute (e.g., at every second minute from 1 through 59).

The alert client 310 may determine whether infractions 312 have occurred by determining whether a user identified by an alert has violated a policy 310 identified by the alert. For example, if a policy 310 includes a metricName component of "user request," a triggerType component of "GREATER_THAN_OR_EQ," an aggregator component of "sum," a timeUnit component of "5 m," a cronEntry component having a value of "1-59/2 * * * * *", and a threshold component of "50," then the alert client 310 may issue or trigger an infraction 312 if a user has sent 50 or more user requests 320 in the past 5 minutes, where alerts are evaluated at every uneven minute.

At operation 6, the alert client 310 may generate an infraction record 312 for every detected infraction 312 and may store the infraction records 312 in the ORDB 332. The ORDB 332 may be implemented using any suitable object-relational database management system (ORDBMS), such as PostgreSQL, Oracle® Database, Informix by IBM®, Microsoft® SQL Server, or the like. The infraction records 312 may be any suitable database object that indicates, inter alia, a user_id of a user, a number of infractions, timestamp of when the infractions occurred and/or were evaluated, and/or other like information. Various examples database objects that may be used for storing the infraction records 312 are discussed infra with regard to FIGS. 8-9.

At operation 7, the PEaaS-WS 306 may pull the infraction records 312 from the ORDB 332 in order to determine whether any users should be suspended or not. The PEaaS-WS 306 may determine whether a suspension should be issued based on the suspension levels indicated by a policy 310. Continuing with the previous example, if the policy 310 includes a first suspension level (e.g., levelNumber: 1) with an infractionCount of 10 and a suspension time of 60 minutes and a second suspension level (e.g., levelNumber: 2) with an infractionCount of 20 and a suspension time of 120, then the PEaaS-WS 306 may determine that a first user should be suspended for 60 minutes when infraction record(s) 312 associated with the first user indicates that 10 infractions occurred during the 5 minute period (e.g., the timeUnit component of "5 m" discussed previously) and that a second user should be suspended for 120 minutes when infraction record(s) 312 associated with the second user indicates that 20 infractions occurred during that 5 minute period. Additionally, the PEaaS-WS 306 may generate and store a list or set of suspensions, which may be provided to the TPP 301 when polled or requested. In alternative embodiments, the alert client 310 may determine the suspended users as discussed previously, and may send the list or set of suspensions to the PEaaS-WS 306 on an asynchronous or periodic basis. Various examples of database objects used for the list or set of suspensions are discussed infra with regard to FIGS. 8-9.

At operation 8, the PEaaS-WS 306 may provide the list of suspensions to the TPP 301 via the PEaaS interface 305. In embodiments, the TPP 301 may send requests to the PEaaS-WS 306 via the PEaaS interface 305 when a list of suspensions is desired, or the PEaaS interface 305 may be configured to poll the PEaaS-WS 306 for suspended users on a periodic basis (e.g., at a predefined interval). After operation 8 is performed, operations 0-8 may repeat as necessary.

Figure 4:
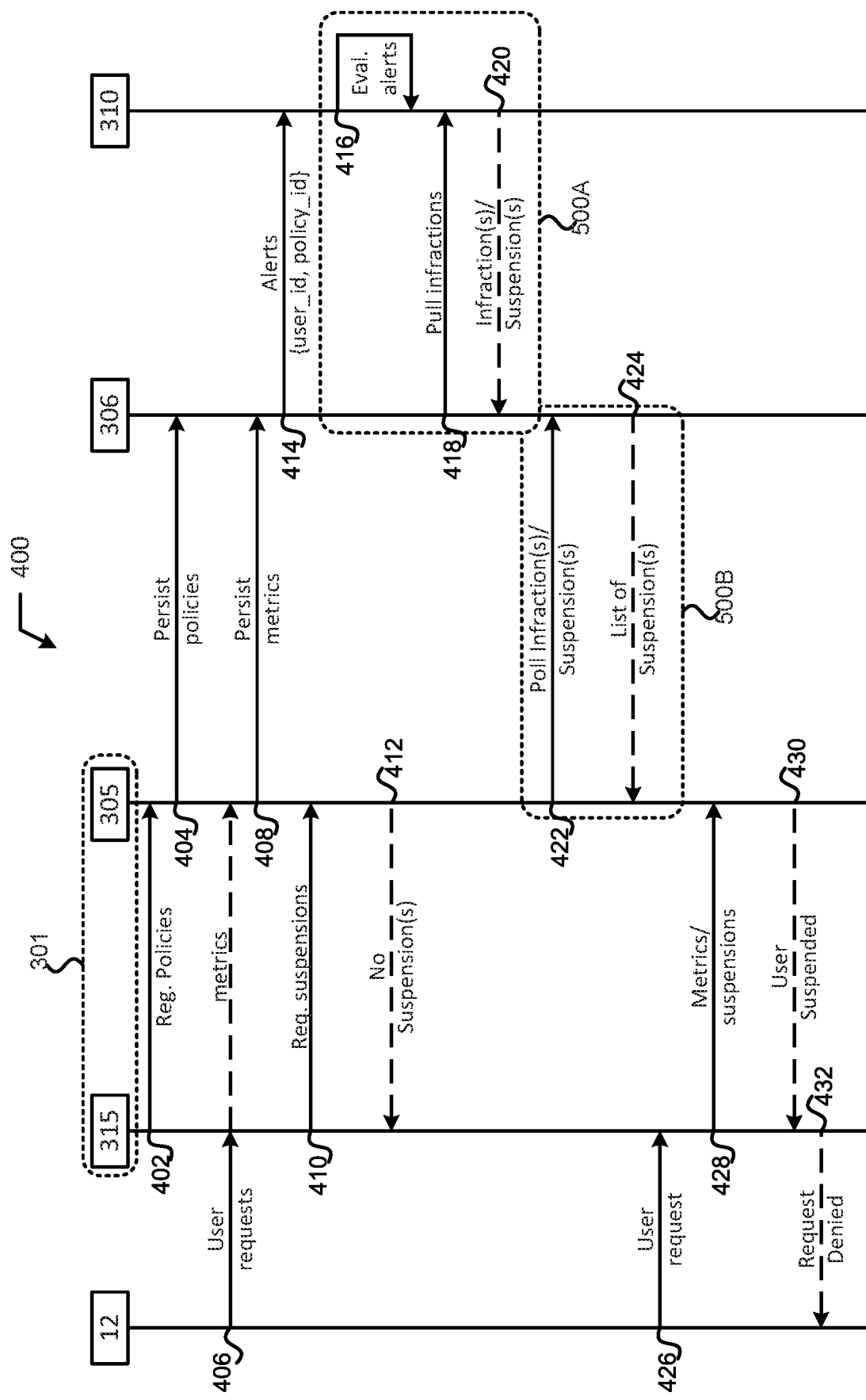
FIG. 4 shows a process for implementing a PEaaS, in accordance with various embodiments.

FIG. 4 illustrates a PEaaS process 400 in accordance with various embodiments. Process 400 may be practiced in an environment that includes the various elements discussed previously with regard to FIGS. 3A-3E. Process 400 may begin at operation 402 where a TPP 301 may define one or more policies 310, which may be registered with the PEaaS by providing the defined policies to the PEaaS interface 305 (e.g., in messages 321), and at operation 404 the PEaaS interface 305 may send the policies 310 to the PEaaS-WS 306 for storage in the ORDS 332.

After the policies 310 have been defined and registered with the PEaaS, at operation 406 user system(s) 12 may send user requests 320 to the service 315 of TPP 301, and based on the user requests 320, user/service parameters 321 may be streamed to the PEaaS interface 305, and then at operation 408, the parameters 321 may be sent to the PEaaS-WS 306 in messages 322 for storage. At operation 414, the PEaaS-WS 306 may generate and send alerts (e.g., in messages 322), indicating the users_ids and policy_ids of the obtained user requests 320, to the alert client 310 and/or for storage in the MQ 331. Meanwhile at operation 410, the service 315 may send a request to the PEaaS interface 305 for a list of suspensions e.g., using a suitable API call or the like), and in response, the PEaaS interface 305 may provide a response 325 indicating that no suspensions have occurred or been issued (if applicable).

As alerts are stored in the MQ 311, suspension determination process 500A may be performed. Process 500A may be a recurring task that operates independently of other operations of process 400. At operation 416, the alert agent 310 may evaluate the alerts stored in the MQ 311 against the usage metrics 311 stored in the TBDS 332 and generate infraction records 312. The alert client 310 may store the infraction records 312 in the ORDB 332. The evaluation of the alerts may be performed according to the evaluation frequencies defined by corresponding policies 310. At operation 418, the PEaaS-WS 306 may pull or otherwise request the stored infraction records 312, which may be provided to the PEaaS-WS 306 at operation 420. In various embodiments, operation 418 may be performed at a predetermined or defined interval. Process 500A is further described with regard to FIG. 5.

Another recurring task that may include operations that may be performed or operate independently of other operations of process 400 is infraction/suspension reporting process 500B. In this example, process 500B may include operation 422 where the PEaaS interface 305 may poll the PEaaS-WS 306 for a list of suspensions or infractions. In response, the PEaaS-WS 306 may provide the list or set of infractions/suspensions that were obtained and/or stored at operation 420 to the PEaaS interface 305 in a message 324. In some embodiments, the PEaaS interface 305 may send a request 323 for the list/set of suspensions/infractions in response to a request 322 from the service 315. In other embodiments, the PEaaS interface 305 may send a request 323 for the list/set of suspensions/infractions 312 at a predetermined or define interval, and the PEaaS interface 305 may cache the list/set of suspensions/infractions using a suitable web caching mechanism. In such embodiments, the list/set of suspensions/infractions may not be provided to the service 315 until requested. Process 500B is further described with regard to FIG. 5.

Meanwhile at operation 426, the service 315 may obtain more user requests 320 from user systems 12, and at operation 428, the service 315 may send a request to the PEaaS interface 305 (e.g., using a suitable API call or the like) for a list/set of suspensions/infractions. In response, at operation 430 the PEaaS interface 305 may provide a response 325 that includes the stored or otherwise obtained list/set of suspensions/infractions. If the list/set of suspensions/infractions includes one or more of the users of user systems 12 that have sent user requests 320 to the service 315, the service may send an appropriate suspension response 326 to the listed users. Otherwise, the service 315 may send an appropriate response 326r based on the requested data or content.

Figure 5:
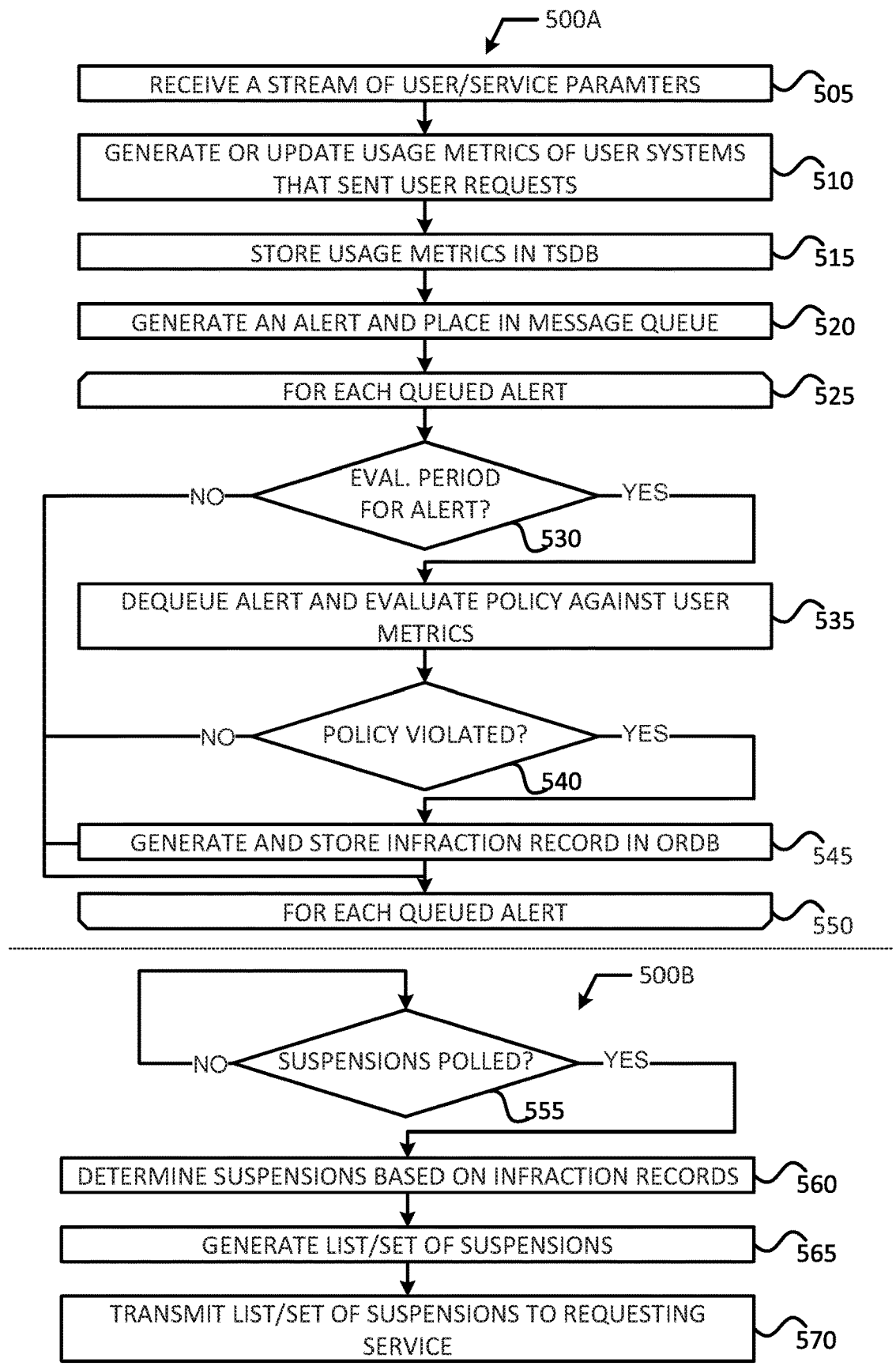
FIG. 5 shows example processes for identifying and reporting infractions and suspensions in accordance with various embodiments.

FIG. 5 illustrates a suspension determination process 500A and an infraction/suspension reporting process 500B, in accordance with various embodiments. Process 500A may be a process of the PEaaS-WS 306 that is used to determine suspensions or infractions for a service 315. Process 500A may begin at block 505 where the processing device(s) 100A of the app server 100 may operate the PEaaS-WS 306 to control receipt of a stream of user and/or service parameters from a service 315. At block 510, the processing device(s) 100A may operate the PEaaS-WS 306 to generate or update usage metrics 311 of users or user systems 12 that sent user requests 320 to the service 315. At block 515, the processing device(s) 100A may operate the PEaaS-WS 306 to control storage of the usage metrics 311 based on the user/service parameters 321. At block 520, the processing device(s) 100A may operate the PEaaS-WS 306 to generate alerts for each user request 320, which are then placed in the MQ 311.

At block 525, the processing device(s) 100A may operate the PEaaS-WS 306 to process each queued alert in turn. At block 530, the processing device(s) 100A may operate the PEaaS-WS 306 to determine whether an evaluation period of a queued alert has occurred. If at block 530 the PEaaS-WS 306 determines that the evaluation period of the queued alert has not occurred, then the PEaaS-WS 306 may proceed to closing loop block 550 to process a next queued alert, if any. If at block 530 the PEaaS-WS 306 determines that the evaluation period of the queued alert has occurred, the PEaaS-WS 306 may proceed to block 535 to dequeue the alert and evaluate a policy 310 indicated by the alert against usage metrics 311 of a user indicated by the alert.

At block 540 the processing device(s) 100A may operate the PEaaS-WS 306 to determine whether the policy 310 has been violated. If at block 540 the PEaaS-WS 306 determines that the policy 310 has not been violated, then the PEaaS-WS 306 may proceed to closing loop block 550 to process a next queued alert, if any. If at block 540 the PEaaS-WS 306 determines that the policy 310 has been violated, then the PEaaS-WS 306 may proceed to block 545 to generate and store an infraction record 312 in the ORDB 332, and may then proceed to closing loop block 550 to process a next queued alert, if any. After performance of block 550, process 500A may end or repeat as necessary.

Process 500B may be a process of the PEaaS-WS 306 that is used to report suspensions or infractions to a service 315. Process 500B may begin at block 555 where the processing device(s) 100A of the app server 100 may operate the PEaaS-WS 306 to determine whether the PEaaS interface 305 or the service 315 has polled or otherwise requested a list of suspensions or infractions. If at block 555 the PEaaS-WS 306 determines that a request for a list of suspensions or infractions has not been received, the PEaaS-WS 306 may loop back to continue to monitor for a polling/request message for a list of suspensions/infractions. If at block 555 the PEaaS-WS 306 determines that a request for a list of suspensions or infractions has been received, the PEaaS-WS 306 may proceed to block 560 to determine whether any users should be suspended based on the stored infraction records 312. At block 565, the processing device(s) 100A may operate the PEaaS-WS 306 to generate a list or set of suspensions based on the suspensions determined at block 560. At block 570, the processing device(s) 100A may operate the PEaaS-WS 306 to control the communication system 100E to transmit the generated list/set of suspensions to the requesting service 315. After performance of block 570, process 500B may end or repeat as necessary.

III. Data Consistency of Policy Enforcement for Distributed Applications

In any embodiment of PEaaS described herein, the application 315 (FIG. 3A) may be a distributed customer application. A distributed customer application may be hosted on more than one host (which may be to enable scaling and/or for other reasons). In a distributed customer application, one of the user requests 320 may be received by a first host (e.g., a processing device of a first server of TPP 301-1, not shown) and another one of the user requests 320 may be received by a second different host (e.g., a processing device of a second different server of TPP 301-1, not shown).

In embodiments of PEaaS in which the application 315 is a distributed customer application, the PEaaS-Interface 305 may be included on each host. A user infraction 312 identified based on a user request 320 received by one of the hosts may result in the message 325 sent to the PEaaS-interface 305 of that host. The message 325 may transmit a suspension value generated for the infraction 312. Based on this message 325, that host may deny a next user request 320 (e.g., from the same user) in the suspension time according to the suspension value, e.g., that host may transmit suspension response 326s.

The PEaaS-WS 306 may propagate information about the infraction 312 to all PEaaS-interfaces 305 (including the PEaaS-interface(s) 305 of the other host(s) of the same distributed application). Based on this propagation, any appropriate next user requests 320 (e.g., from the same user) that are received on the other hosts in the suspension time may also be denied. For instance, the other hosts may transmit suspension responses 326s for these next user requests 320 responsive to the propagated information about the infraction 312.

In some embodiments, the information may be propagated based on recurring tasks. Each of the PEaaS-interfaces 305 may have a recurring task to "check in" with the PEaaS-WS 306 to discover suspensions identified responsive to user requests 320 received by other hosts. Typically the recurring tasks may occur at a same interval (e.g., every minute), although this is not required. Recurring tasks based on a same interval may occur at the same time or different times (in some embodiment, decay timers may be used so that the check-in requests are likely to be received at different times based on a same interval instead of all at once, although this is not required).

In one embodiment, each PEaaS-interface 305 may check-in based on a same interval (e.g., a predefined polling interval used by all the PEaaS-interfaces 305, not selectable by the customers). In other embodiments, it may be possible and practical for this interval to be selectable by the customer for the entire TPP 301-1 and/or for each service. In one example, the PEaaS-WS 306 may receive a policy value to define the interval for a portion of the service of the TPP 301-1 (e.g., for one service of the TPP 301-1 or all services of the TPP 301-1).

Figure 6:
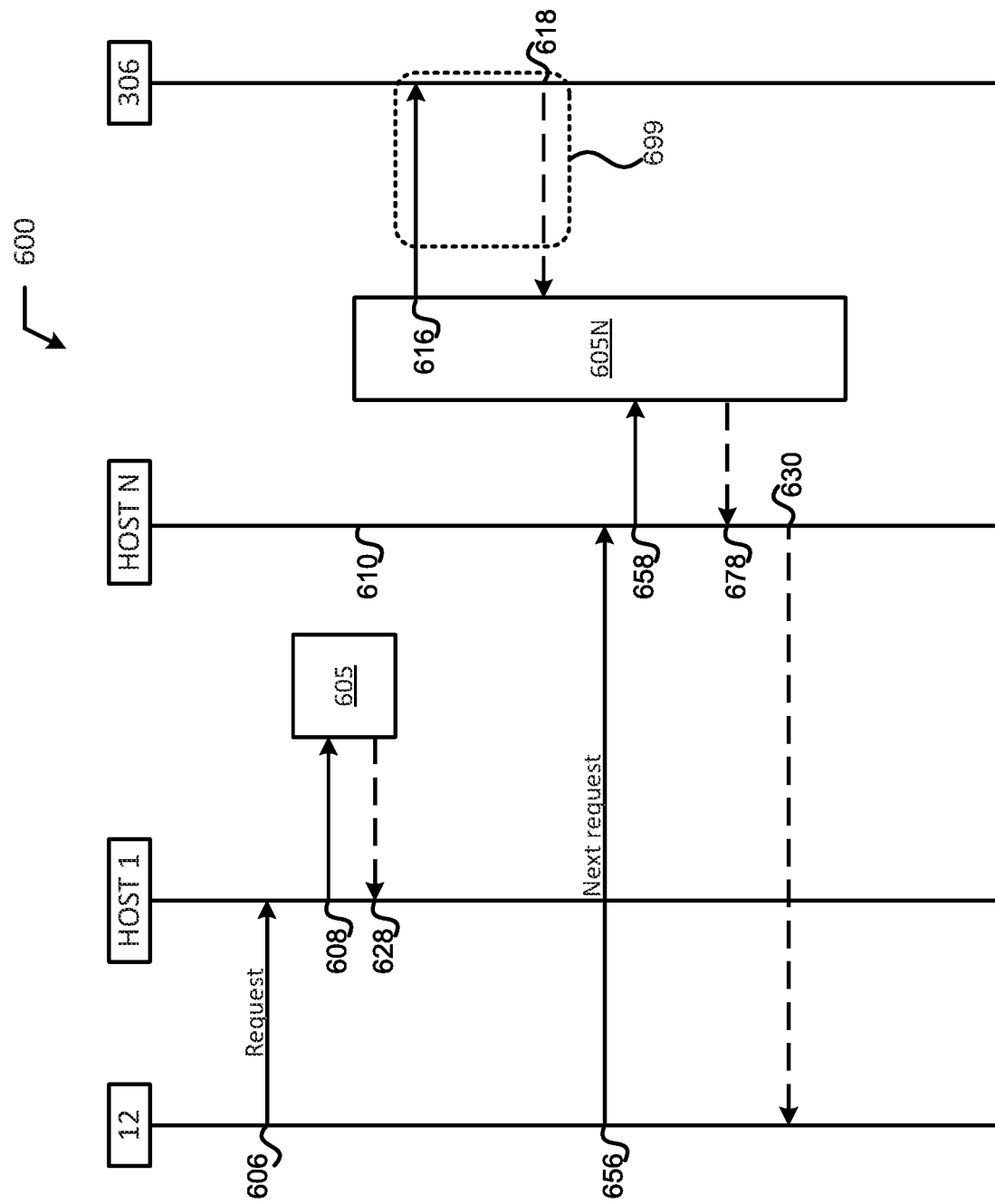
FIG. 6 shows a process for propagating policy violations through a distributed platform, in accordance with various embodiments.

FIG. 6 shows a process 600 for practicing various embodiments discussed herein in an environment with more than one host for a same customer application 315 (e.g., a distributed customer application). Such an environment may include N hosts of the TPP 301-1 of the distributed customer application. FIG. 6 shows the process with a first host (host 1) and N additional hosts (at least one host N). Each host includes one of the PEaaS-interface 305 (FIG. 3A), e.g., host 1 includes PEaaS-interface 605 and the one or more additional hosts each include a PEaaS-interface 605N (PEaaS-interfaces 605 and 605N may be similar to any PEaaS-interface described herein, such as PEaaS-interface 305). The PEaaS-interfaces 605 and 605N may communicate with a PEaaS-WS (not shown) that may be similar to PEaaS-WS 306.

Signals 606, 608, and 628 may be similar to signals 406, 408, and 428, respectively (e.g., signal 628 may be a suspension response 326s from a PEaaS-interface to a host). Each PEaaS-interface in an environment (e.g., PEaaS-interfaces 605 and 605N) may perform a recurring propagation task. The diagram illustrates an instance 699 of a recurring propagation task for the PEaaS-interface N. The instance 699 may occur on or after identification of a suspension by the PEaaS backend system 307 (FIG. 3), say following a message similar to message 420 (FIG. 4).

The instance 699 of the recurring task may include a synchronization request 616 and a response 618 to propagate any suspension values that were provided to any one of the other PEaaS interfaces 605 and 605N. For instance, the response 618 may include a same suspension value identified following the recordation of a usage metric corresponding to user request 606 (e.g., a same suspension value that was transmitted to PEaaS-interface 605 in signal 628).

After the PEaaS-interface 605N identifies the suspension value of response 618, the PEaaS-interface 605N may signal host N to prevent host N from providing access to the user during the suspension time. For instance, supposing a next user request 656 for the same user arrives at host N instead of host 1. In response to receipt of next request 656, the PEaaS-interface 605N may identify a signal 658 (similar to signal 608) and may transmit a response 678 (similar to response 628). Based on the response 678, host N may transmit a request denial 630.

Figure 7A:
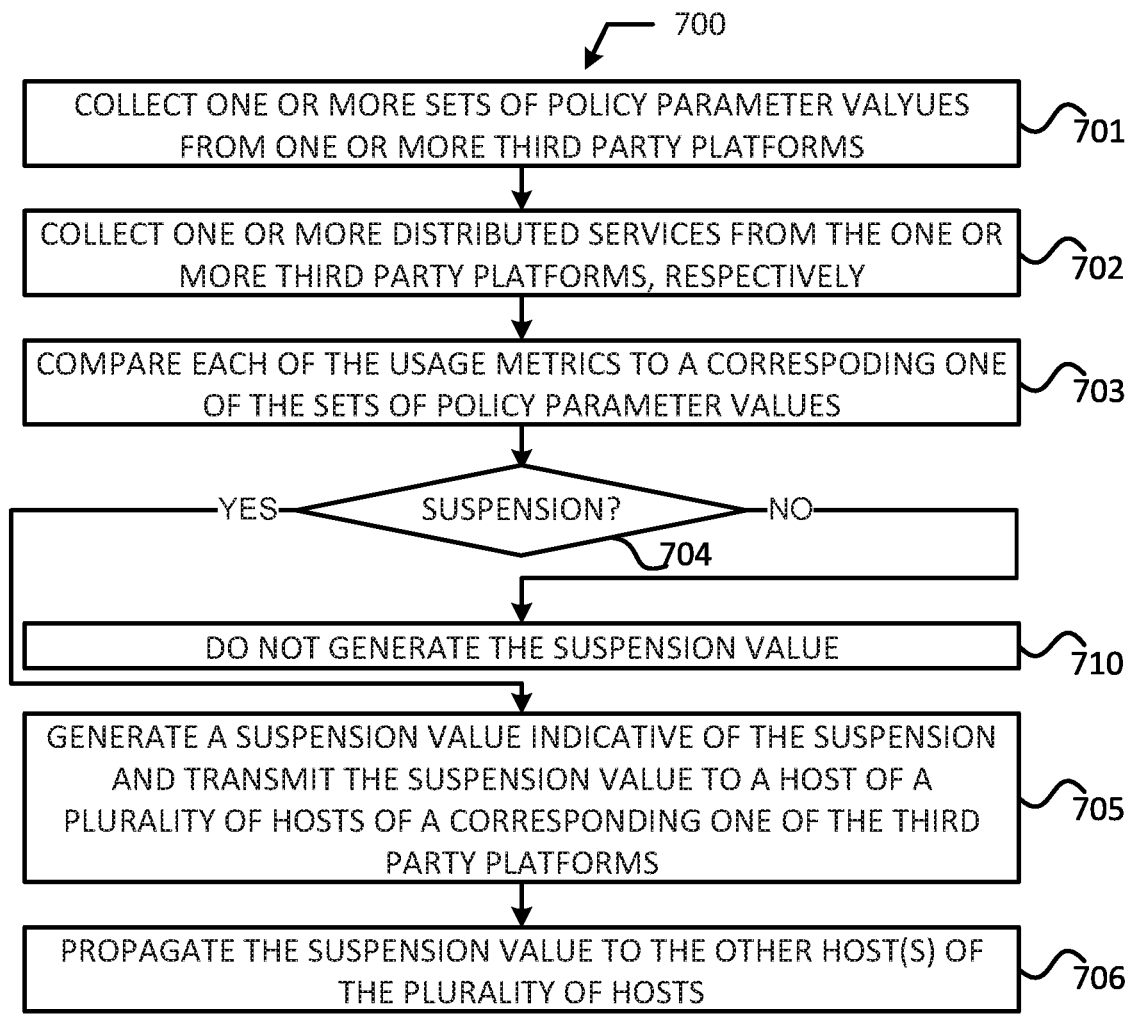
FIGS. 7A and 7B show example processes for propagating policy violations and obtaining policy violations to be propagated, respectively, in accordance with various embodiments.

FIG. 7A shows a process 700 that may be performed by any processing device described herein, such as processing device 100A (FIG. 3A). In block 701, the processing device may collect one or more policy parameter values from one or more third party platforms, respectively. Each policy parameter value may be any TPP-selectable value described herein, such as a threshold for issuing a user suspension for a distributed service provided by a plurality of hosts of a respective one of the third party platforms, a value to define a propagation interval, or the like.

In block 702, the processing device may collect one or more usage metric sets for one or more distributed services from the one or more third party platforms, respectively. Each usage metric set may include one or more usage metrics for one or more users, respectively, for a corresponding one of the distributed services. In block 703, the processing device may compare each of the usage metrics to a corresponding one of the sets of policy parameter values (e.g., the usage metric may be checked based on a threshold defined by a corresponding one of the policy parameter values).

In response to identification of a suspension of one of the users for one of the one or more distributed services in diamond 704, in block 705 the processing device may generate a suspension value indicative of the suspension and transmit the value to a host of a plurality of hosts of a corresponding one of the third party platforms. For instance, in block 705 the processing device may, following comparison of one of the usage metrics, transmit the suspension value to only the host that provided the one of the usage metrics.

In block 706, the processing device may propagate the suspension value to the other host(s) of the plurality of hosts. For instance, in block 706 the processing device may transmit the suspension value to the remaining host(s). Propagation(s) may be responsive to the remaining host(s) checking in based on the propagation interval.

Figure 7B:
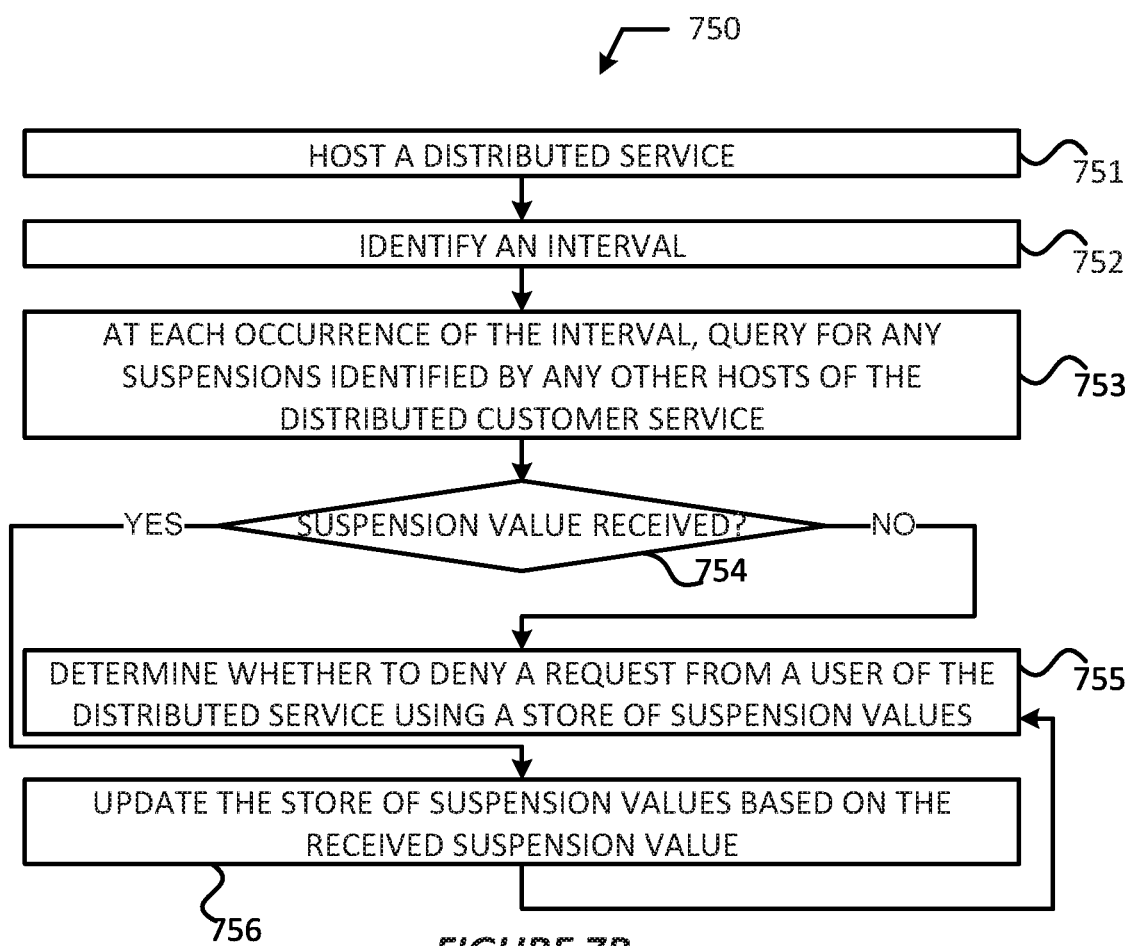

FIG. 7B shows a process 750 that may be performed by any processing device described herein, such as processing device 301A (FIG. 3A). In block 751, the processing device may host a distributed service (e.g., a processing device may host the distributed service together with processing device(s) of other host(s) of the distributed service).

In block 752, the processing device may identify an interval. In block 753, at each occurrence of the interval, the processing device may query for any suspensions identified by any other hosts of the distributed service. If no suspension value is received in diamond 754, in block 755 the processing device may determine whether to deny a request from a user of the distributed service using a store of suspension values.

If a suspension value is received in response to the query in diamond 754, in block 756 the processing device may update the store of suspension values based on the received suspension value. Following an update of the store of suspension values, the processing device may determine whether to deny the request from the user using the updated store of suspension values.

IV. Asynchronous User Tracking Mechanisms

As discussed previously, the service protection that the PEaaS offers may be based on a list of policies per TPP 301 or per service of a TPP 301. In various embodiments, the PEaaS may also include mechanisms for asynchronously tracking user infractions or suspensions. Such mechanism may also be referred to as "lazy tracking mechanisms" or the like. The lazy tracking mechanism may track and perform asynchronous (async) computation of infraction records 312 and suspension sets/lists. The async computation of infraction records 312 and suspension sets may include tracking or accounting for infractions 312 and suspensions of users or user systems 12 that are relevant to a particular service 315 provided by a TPP 301. In the lazy tracking embodiments, database objects may be used for infractions and suspensions. In such embodiments, there may initially be no policy-to-user-associations when a service 315 starts. After a service 315 starts operation, users may be dynamically added to an alert database object (DBO) when they initially request service(s) 315 from a policy-protected endpoint (e.g., a TPP 301 that provides the service 315). As the PEaaS and/or the service 315 run, users may be dynamically suspended according to the service's 315 policy. Each user may be dynamically added to a suspension DBO when that user is suspended, and each user may be dynamically deleted or removed from the suspension DBO when a corresponding suspension period has expired. Examples of the lazy tracking mechanisms are shown by FIGS. 8 and 9.

Figure 8:
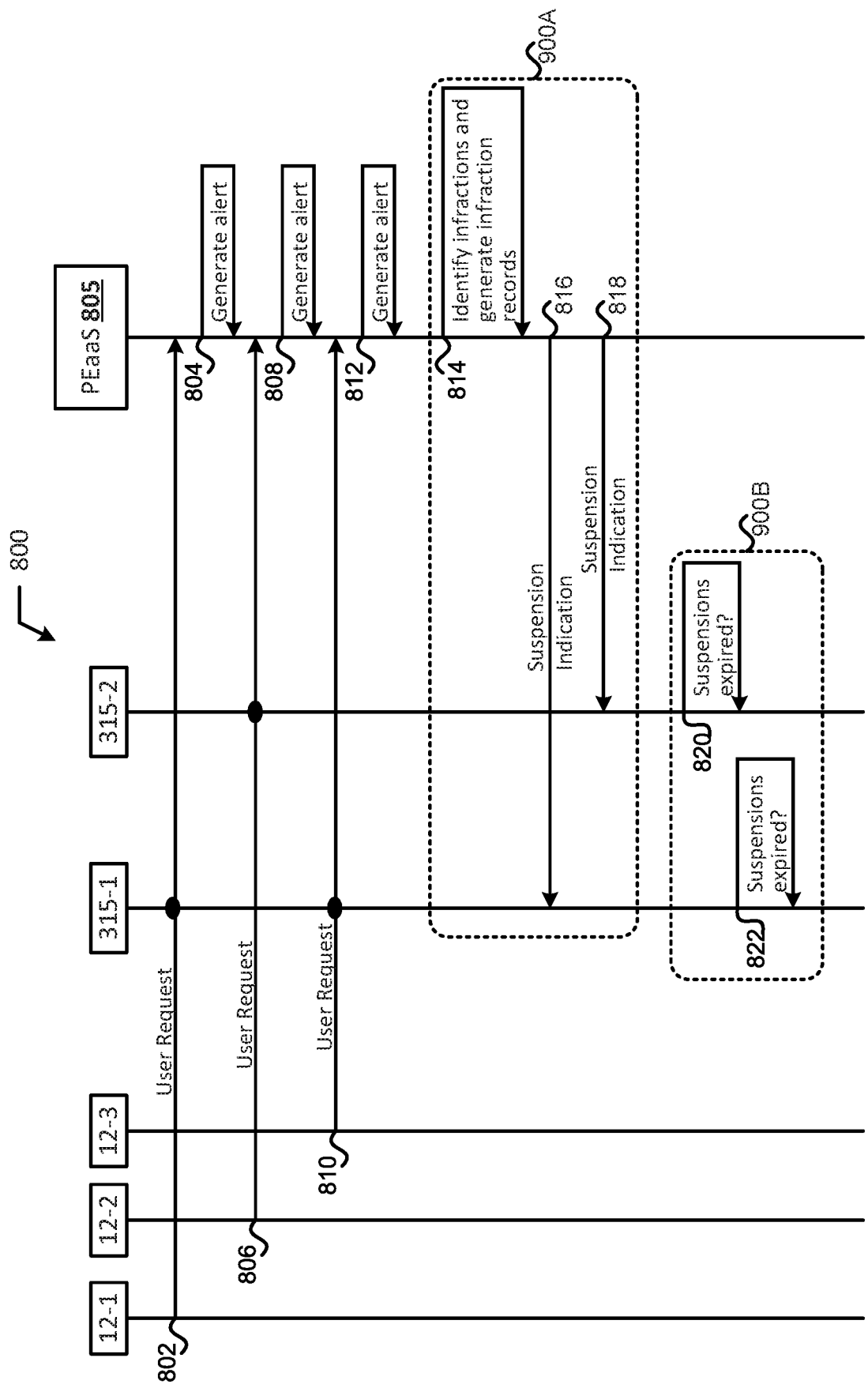
FIG. 8 shows an example lazy tracking process, in accordance with various embodiments.
Figure 9:
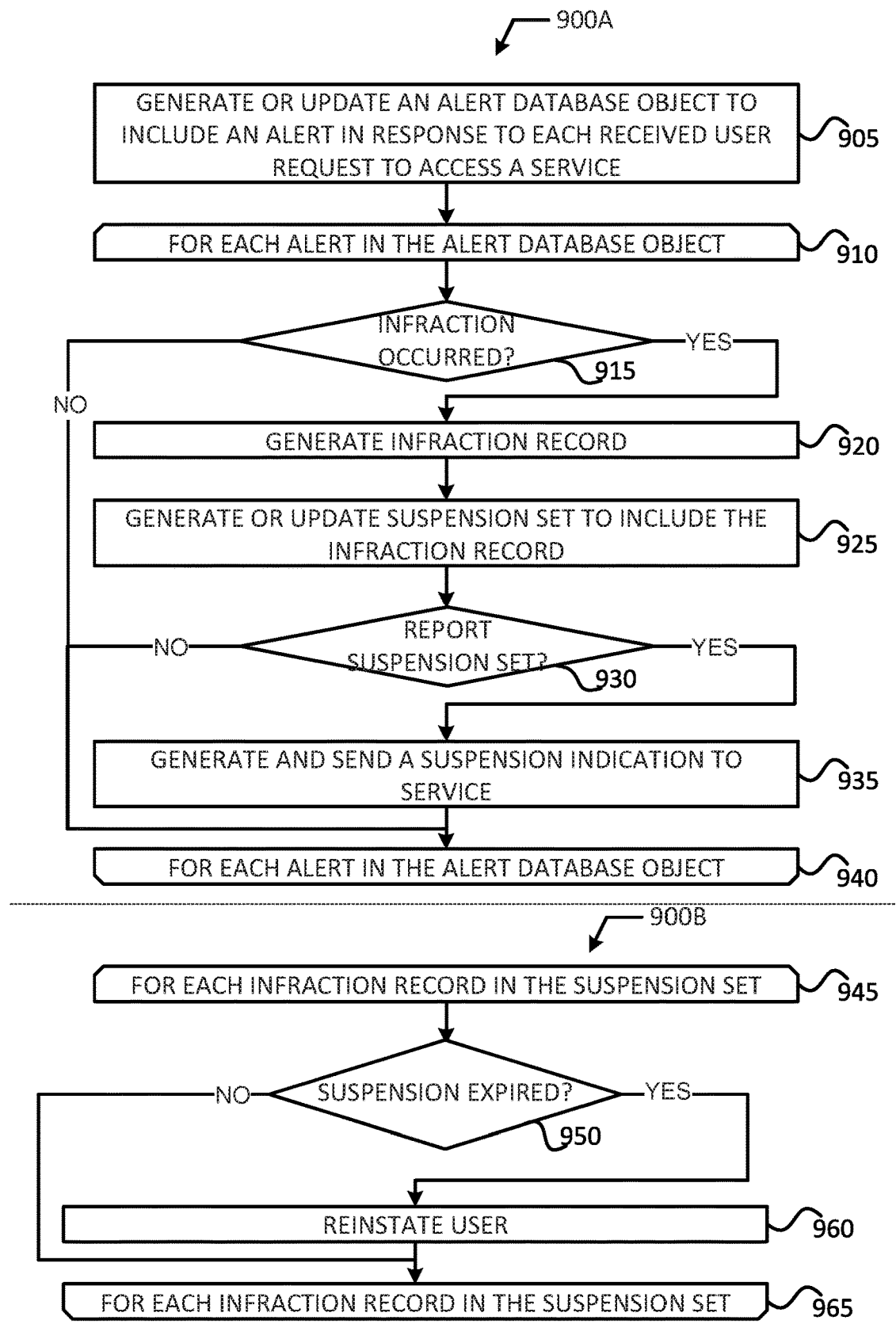
FIG. 9 shows example processes for determining user suspensions and user reinstatements, in accordance with various embodiments.

FIG. 8 illustrates a lazy tracking process 800 in accordance with various embodiments. In this example, there may be three different user systems 12, namely user system 12-1, user system 12-2, and user system 12-3, each of which is being used by a different user. This example also includes two services 315, namely service 315-1 that may be provided by TPP 301-1 of FIG. 3A and service 315-2 that may be provided by TPP 301-2 of FIG. 3A. Additionally, the example of FIG. 8 also includes a PEaaS 805, which may represent all of the PEaaS entities shown and described with regard to FIGS. 3A-7B, such as the PEaaS interface 305, PEaaS-WS 306, and PEaaS-BES 307.

Process 800 may begin at operation 802 where the user system 12-1 sends a request 320 to access a service 315-1, and associated user/service parameters 321 may be provided to the PEaaS 805 in a same or similar manner as described previously. At operation 804, the PEaaS 805 may generate an alert for the user of user system 12-1. The alert may be an AVP/KVP that includes a client_id of the user using user system 12 that sent a user request 320 to access a service 315-1 and a policy 310 associated with service 315-1. As mentioned previously, the alerts may be stored in the MQ 331 once they are generated. According to various embodiments, before the service 315-1 has been started or otherwise operates, there may be no stored alerts or alert DBO. In such embodiments, the first or initial user request 320 that is obtained may trigger the PEaaS 805 to generate the alerts and alert DBO(s). An example of the MQ 331 after operation 804 is shown by table 13.

TABLE 13 alert DBO in MQ 331 after operation 804

| Service | User-Policy | Suspension Condition | Policy Enabled |
|---|---|---|---|
| serviceId_315-1 | clientId_12-1 - policyId_315-1 | If >60 reqs/hr; | true |

Table 13 shows an example of an alert DBO that may be stored in the MQ 331 after an alert is generated. The example of table 13 may include four record types, including a "service" record type, a "user-policy" record type, a "suspension condition" record type, and a "policy enabled" record type. The term "record type" may refer to a field or column of a DBO, which may indicate the type of values or data that can be stored in a record of that record type. The term "record" may refer to a single instance of an object or data element. The records stored by table 13 include a "serviceId_315-1" record having a "service" record type, a "clientId_12-1-policyId_315-1" record having a "user-policy" record type, a "If>60 reqs/hr" record having a "suspension condition" record type, and a "true" record having a "policy enabled" record type. The individual records shown by table 13 may be a "relationship" or "relation", which may be any connection between two or more data elements, records, record types, or other objects.

The service field of the alert DBO may indicate a service identifier (service_id) of a service that was/is accessed by a particular user. In the example of table 13, the service field stores a value of "serviceId_315-1", which may be a service_id of service 315-1. The user field of the alert DBO may indicate a client_id of a user that has access the service indicated by the service field. In this example, the user of user system 12-1 may have a client ID of "clientId_12-1", and the policy 310 associated with the requested service 315-1 may have a policy_id of "policyId_315-1." The naming conventions used herein are used for ease of description, and any naming convention for services, policies, and users may be used in various embodiments. Furthermore, records may store or otherwise include a user-policy association (e.g., an AVP, a KVP, etc.), which may be a data representation including an attribute and a value where the attribute defines a property of the value. In the example of table 13, the "clientId_12-1-policyId_315-1" record may be an AVP where the client_id ("clientId_12-1") is a value and the policy_id ("policyId_315-1") is an attribute of that value.

The suspension condition field of the alert DBO may indicate various policy parameters for issuing a suspension (e.g., thresholds, trigger types, aggregators, etc.). In the example of table 13, the policy 310 of service 315-1 may define a suspension level to include a threshold of sending more than 60 user requests 320 in one hour. Note that suspension levels may be based on how many times a user has violated the thresholds or caused an infraction. Each policy 310 may only have one such condition per suspension level. In this example, the condition of 60 user requests 320 in one hour may be defined as a first suspension level. If the user sends 60 user requests 320 per hour, this may be considered one infraction, and the user may be suspended after committing the one infraction. Additionally, a second suspension level may be defined with a longer suspension period and may have a condition of five infractions in a given period of time.

The enabled field may indicate whether the corresponding policy is active or inactive for a corresponding user. In the example of table 13, the active/inactive indicator is expressed using a boolean value (e.g., "true" or "false," "yes" or "no," "1" or "0," etc.), but other values may be used in other embodiments. In table 13, the boolean value of "true" may indicate that the policy 310 of service 315-1 is active for clientId_12-1.

Referring back to FIG. 8, at operation 806, the user system 12-2 may send a request 320 to access the service 315-2, and associated user/service parameters 321 may be provided to the PEaaS 805 in a same or similar manner as described previously. At operation 808, the PEaaS 805 may generate an alert for the user of user system 12-2. At operation 810, the user system 12-3 may send a request 320 to access the service 315-2, and associated user/service parameters 321 may be provided to the PEaaS 805 in a same or similar manner as described previously. At operation 812, the PEaaS 805 may generate an alert for the user of user system 12-2. In embodiments, each of operations 808 and 812 may involve the PEaaS 805 updating the existing alert DBO to include the relevant alert information based on the user requests 320 that were sent at operations 806 and 810, respectively. An example of the MQ 331 after operations 808 and 812 is shown by tables 14 and 15, respectively.

TABLE 14 alerts in MQ 331 after operation 808

| Service | User-Policy | Suspension Condition | Policy Enabled |
|---|---|---|---|
| serviceId_315-1 | clientId_12-1 - policyId_315-1 | If >60 reqs/hr | true |
| serviceId_315-2 | clientId_12-2 - policyId_315-2 | AVG reqs BTWN 0 and 100 w/in 20 min | true |

TABLE 15 alerts in MQ 331 after operation 812

| Service | User-Policy | Suspension Condition | Policy Enabled |
|---|---|---|---|
| serviceId_315-1 | clientId_12-1 - policyId_315-1 | If >60 reqs/hr | true |
| serviceId_315-2 | clientId_12-2 - policyId_315-2 | AVG reqs BTWN 0 and 100 w/in 20 min | true |
| serviceId_315-1 | clientId_12-3 - policyId 315-1 | If >60 reqs/hr | true |

As shown by tables 14 and 15, the user of user system 12-2 has a client ID of "useId_12-2" and the user of user system 12-3 has a client ID of "clientId_12-3". Additionally, the service 315-2 may have a service ID of "serviceID_315-2" and an associated policy with a policy_id of "policyId_315-2". The records in tables 14 and 15 may have similar AVPs as discussed previously with regard to table 13. Additionally, the suspension condition field for clientId_12-3 may include the same record as the suspension condition field for clientId_12-1 because each of those users attempted to access the same service, namely service 315-1. By contrast, the suspension condition field for clientId_12-2 may include a different suspension condition, which may be based on the policy 310 of service 315-2. In this example, the suspension condition record for clientId_12-2 may indicate that a suspension should be issued when a mean of all user requests 320 sent in a 20 minute period is between 0 and 100.

As alerts are generated and stored in the MQ 311 and as infraction records 312 are generated and stored, suspension determination process 900A may be performed. Process 900A may be a recurring task that operates independently of other operations of process 800.

At operation 814, the PEaaS 805 may identify or determine whether any infractions have occurred and generate infraction records 312. In embodiments, the PEaaS 805 may dequeue the alerts in the MQ 331 for evaluation according to a predefined or configured. evaluation frequency. Based on the evaluation, the PEaaS 805 may generate infraction records 312 in a same or similar manner as discussed previously, which may be stored in the ORDB 332 as discussed previously (see e.g., FIGS. 3A-5). In embodiments, the infraction records 312 may be generated and stored in a suspension set (or "suspension DBO" or the like). In some embodiments, the suspension DBO may be stored in the ORDB 332. In other embodiments, the PEaaS-WS 306 may pull the infraction records 312 from the ORDB 332 and generate and locally store the suspension DBO. According to various embodiments, before the service 315-1 has been started or otherwise operates and/or prior to detection of a user infraction, there may be no stored infraction records 312 or suspension DBOs. In such embodiments, detection of one or more infractions by the PEaaS 805 may trigger the PEaaS 805 to generate the suspension DBO. Table 16 shows an example suspension set/DBO.

TABLE 16 suspension DBO after operation 814

| User | Suspension Period |
|---|---|
| clientId_12-1 | 1 hour |
| clientId_12-2 | 2 hours |

As shown by table 16, the suspension DBO may include a "user" field to include a client_id of a suspended user, and a "suspension period" field to indicate an amount of time that a corresponding user is to be blocked, prevented from, or otherwise denied access to a service 315. In this example, the user of user system 12-1 ("clientId_12-1") has made more than 60 calls in an hour, and therefore, that has been suspended from service 315-1 for 1 hour according to suspension level 1 of the policy 310 defined for service 315-1 (see e.g., table 15); and the user of user system 12-2 ("clientId_12-2") has made an average between 0 and 100 within a 20 minute period, and therefore, that user has been suspended from service 315-2 for 2 hours according to the policy 310 defined for service 315-2 (see e.g., table 15).

At operations 816 and 818, if there are any suspended users, the PEaaS 805 may send suspension indications to individual services 315 to notify the services 315 of the users that should be suspended. In this example, since each service 315-1 and 315-2 have one user that has been determined to be suspended, the PEaaS 805 sends the suspension indications to each service 315-1 and 315-2. In some embodiments, the PEaaS 805 may send the suspension indications at operations 816 and 818 to services 315-1 and 315-2, respectively, when the suspensions are determined or detected. In other embodiments, the PEaaS 805 may send the suspension indications at operations 816 and 818 only when polled or requested by a respective service 315-1, 315-2. Although not shown by FIG. 8, in some embodiments, the PEaaS 805 may retain the suspension set indefinitely or for some period of time after the suspension indication is sent to the service(s) 315. In other embodiments, the PEaaS 805 may delete the suspension set after the suspension indication is sent to the service(s) 315. Process 900A is further described with regard to FIG. 9.

As suspensions are identified and issued by implementing process 900A, a suspension invalidation process 900B may also be performed. Process 900B may be a recurring task that operates independently of other operations of process 800. At operations 820 and 822, the PEaaS interfaces 305 implemented by each service 315 may determine whether any of the suspensions have expired, and may reinstate suspended users if any suspensions have expired. In embodiments, the PEaaS interface 305 of each service 315 may read a timestamp of when the suspension was issued and/or a timestamp for when the suspension is to expire. Upon expiration of the suspension, the PEaaS interface 305 may act as if the user has been reinstated (see e.g., discussion of FIGS. 3B-3D). In some embodiments, the most recent suspension(s) or suspension set(s) may remain in a cache associated with a particular service 315, and the services 315 that use the PEaaS interface 305 may have a method they use to clear expired suspensions. Regardless of whether a reinstatement indication is sent separately or with a suspension indication, the PEaaS 805 may update the suspension DBO. Continuing with the example of table 16, if one hour has passed, the PEaaS 805 may send a reinstatement message to service 315-1 to indicate that the suspension of the user of user system 12-1 has expired and should be reinstated to use the service 315-1. In this example, the suspension DBO may be updated as shown by table 17.

TABLE 17 suspension DBO after operation 820

| User | Suspension Period |
|---|---|
| ~~clientId_12-1~~ | ~~1 hour~~ |
| clientId_12-2 | 2 hours |

In the example of tables 17-18, in response to determining that the suspension of the user of user system 12-1 has expired, the PEaaS 805 may update the suspension DBO by removing the entry including the client ID of the user of user system 12-1. In table 17, deleted records are indicated by strike-through text. The operations of process 800 may continue or repeat as necessary.

Additionally, the "policy enabled" field of the alert DBO may be updated to reflect that a user has not accessed (or requested access to) a service during a certain period of time, for example, by setting the "policy enabled" field to "false". Otherwise, the policy enabled field may remain unchanged after a suspension expires. An example is shown by table 18, where the PEaaS 805 may update the policy enabled field of the alert DBO to indicate that the policy 310 of service 315-1 is inactive for that user (e.g., by updating the policy enabled field to have a "false" value) because the user of user system 12-1 has not called the policy-protected endpoint for a predefined period of time (e.g., 24 hours).

TABLE 18 alert DBO

| Service | User-Policy | Suspension Condition | Policy Enabled |
|---|---|---|---|
| serviceId_315-1 | clientId_12-1 - policyId_315-1 | 1: If >60 reqs/hr | false |

TABLE 18-continued alert DBO

| Service | User-Policy | Suspension Condition | Policy Enabled |
|---|---|---|---|
| serviceId_315-2 | clientId_12-2 - policyId_315-2 | AVG reqs BTWN 0 and 100 w/in 20 min | true |
| serviceId_315-1 | clientId_12-3 - policyId 315-1 | 1: If >60 reqs/hr | true |

FIG. 9 illustrates a suspension determination process 900A and a suspension invalidation process 900B, in accordance with various embodiments. Process 900A may be a process that is used by a PEaaS 805, which may be implemented by one or more network devices as discussed previously, to determine whether suspensions should be issued for users of a service 315. Process 900A may begin at block 905 where processing device(s) may operate the PEaaS 805 to generate or update an alert database object (DBO) to include an alert in response to each received user request 320 to access a service 315. At block 910, the processing device(s) may operate the PEaaS 805 to process each alert in the alert DBO in turn.

At block 915, the processing device(s) may operate the PEaaS 805 to determine whether an infraction has occurred. If at block 915 the PEaaS 805 determines that no infractions have occurred, then the PEaaS 805 may proceed to block 940 to process a next alert, if any. If at block 915 the PEaaS 805 determines that an infraction has occurred, then the PEaaS 805 may proceed to block 920 to generate an infraction record 312, and at block 925, the processing device(s) may operate the PEaaS 805 to generate or update a suspension set to include the infraction record 312.

At block 930, the processing device(s) may operate the PEaaS 805 to determine whether suspensions should be reported to the service 315. In embodiments, this determination may be based on receipt of a polling message 322 or a request message 322 from the service 315. In other embodiments, the determination at block 930 may be based on a reporting interval (e.g., expiration of a suspension reporting timer or the like). If at block 930 the PEaaS 805 determines that the suspension set should not be reported, then the PEaaS 805 may proceed to block 940 to process a next alert, if any. If at block 930 the PEaaS 805 determines that the suspension set should not be reported, then the processing device(s) may proceed to block 935 to generate a suspension indication to include or indicate the suspension set, and the processing device(s) may operate the PEaaS 805 to control a communication system(s) to transmit the suspension indication to the service 315. At block 940, the processing device(s) may operate the PEaaS 805 to process a next alert, if any. After performance of block 940, process 900A may repeat as necessary.

Process 900B may be a process of the PEaaS interface implemented by a TP P301 or a particular service 315 that is used to reinstate suspended users. Process 900B may begin at block 945 where processing device(s) of the TPP 301 may operate the PEaaS interface to process each infraction record of a suspension set/DBO, in turn. At block 950, the processing device(s) may operate the PEaaS interface to determine whether a suspension has expired. This determination may be based on detecting expiration of a suspension timer associated with a suspended user, checking a timestamp of when the suspension is supposed to expire and comparing the timestamp with a current time, determining a difference between a current time and a timestamp of when the user was suspended, or checking some other condition(s) or criteria as defined by a policy 310. If at block 950 the PEaaS interface determines that no suspensions have expired, then the PEaaS interface may proceed to block 965 to process a next infraction record 312, if any. If at block 950 the PEaaS interface determines that the suspension has expired or otherwise ended, then the PEaaS interface may proceed to block 960 to reinstate the user. In some embodiments, the PEaaS interface may simply act as if the user has not been suspended so that the user may access the service 315 on their own. In some embodiments, the PEaaS interface may generate and send a reinstatement message 325 to the service 315, and the service 315 may provide the reinstatement message 326r to a user system 12 associated with that user. In some embodiments, the reinstatement message 325/326 may be sent as soon as possible after the suspension has expired. In other embodiments, the reinstatement message 325/326 may be stored and sent at some other time. At block 965, the processing device(s) may operate the PEaaS interface to process a next infraction record 312, if any infraction records 312 remain for processing. Otherwise, after performance of block 965, process 900B may end or repeat as necessary.

V. Opaque Interface for Enclosed/Wrapped Asynchronous Pushing and/or Pulling Data Between PEaaS Components In some systems in which metrics are collected for a service, latency may be imposed on the service due to the collection of the metrics. For instance, in some architectures, a server corresponding to a service may execute a record metric portion of its code to record a metric in a database. In these architectures, the server may wait for a period of time before executing a next portion of its code. The duration of the wait may be related to completion of a database operation (e.g., a round trip time to record the metric in the database).

If the next portion of the code (to be executed following the wait) is a user-facing operation, the waiting by the server may result in a user of the service experiencing a noticeable delay. For instance, the wait by the server may contribute significantly to a total duration between a time the user asserts an input for a service into a user system and a time that the user system displays the corresponding output for the service. Accordingly, the wait by the server may affect the user experience with the server. Due to the impact on the user experience, the recording of the metric may be referred to as "non-opaque" (because the noticeable impact to the user experience makes the recording of the metric visible to the user).

Any embodiment of PEaaS described herein may include an opaque interface for enclosed/wrapped asynchronous pushing and/or pulling data between PEaaS components. When a service using PEaaS records a usage metric there may be no data transfer latency (or reduced data transfer latency as compared to some other services with a non-opaque metric recording). A processor executing the application 315 (e.g., a processor of processing device 301A) may execute code as fast as it is able to run (e.g., without the wait imposed by some other systems in which metrics are collected for a service).

In some embodiments, the PEaaS interface 305 may be configured to cache (e.g., immediately cache) a usage metric. The application 315 need not be aware of any cache—the application 315 may only transmit the usage metric to the PEaaS interface 305 and not experience any wait following the transmission. The PEaaS interface 305 and the PEaaS-WS 306 may be configured to communicate the usage metric at a different time (e.g., a collection of the usage metric by the PEaaS-WS 306 from the PEaaS-WS interface 305 may be asynchronous with the communication of the usage metric from the application 315 to the PEaaS interface 305). Additionally, when the service needs to check for violations of policies, data-pulling (e.g., recurring tasks 500A or 500B, FIG. 4) may also be opaque to the users of the service of the application 315. In some embodiments, communication of policy parameter values, usage metrics, and/or infraction data (e.g., a suspension value) may be asynchronously communicated (e.g., pulled/pushed) between the PEaaS interface 305 and the PEaaS-WS 306.

Figure 10:
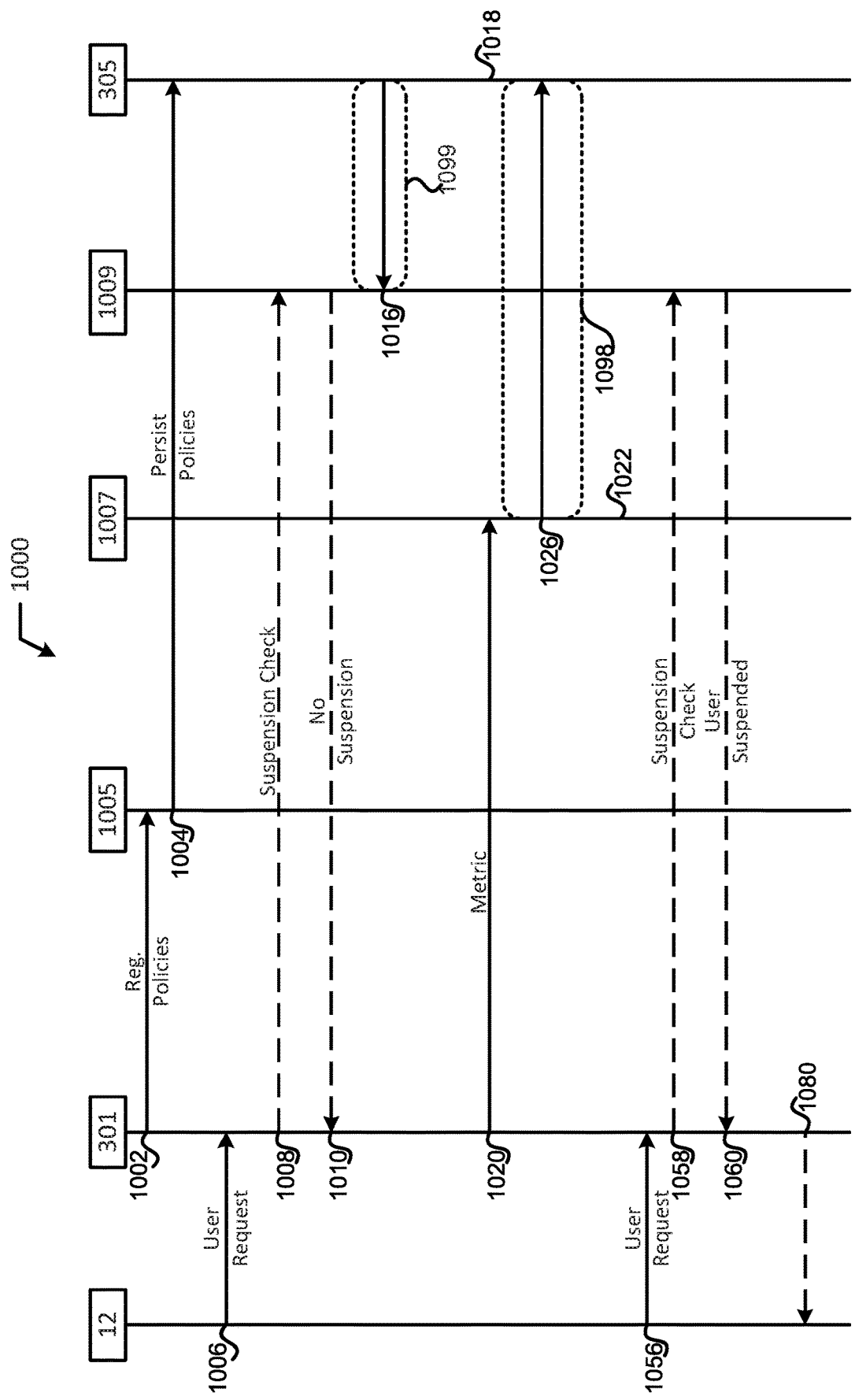
FIG. 10 shows an example process for enclosed/wrapped asynchronous pushing and/or pulling data between PEaaS components, in accordance with various embodiments.

FIG. 10 shows a process 1000 for practicing various embodiments discussed herein in embodiments featuring an opaque interface for enclosed/wrapped asynchronous pushing/pulling data between PEaaS components. The PEaaS interface 305 (FIG. 3A) may include a cache 1005 to store policy parameter values, a cache 1006 to store usage metrics, and a cache 1007 to store suspension values.

The PEaaS interface 305 may receive a policy parameter value in signal 1002, and may hold this value in cache 1005 for asynchronous communication of this value to the PEaaS-WS 306. The PEaaS interface 305 may push a set of policy parameter values to the PEaaS-WS 306 (signal 1004). The set of policy parameter values may include values available in the cache 1005 at a time of the transmission of signal 1004 (e.g., may include the policy parameter value and may include other policy parameter values available in the cache 1005).

Similarly, the PEaaS interface 305 may receive a usage metric in signal 1020 responsive to the TPP 301 receiving a user request 1006, and may hold this usage metric in cache 1007 for asynchronous communication of this usage metric to the PEaaS-WS 306. The PEaaS interface 305 may, based on recurring task 1098, push a set of usage metrics to the PEaaS-WS 306 (signal 1026). The set of usage metrics may include usage metrics available in the cache 1007 at a time of the transmission of the signal 1026 (e.g., may include the usage metric and may include other usage metrics available in the cache 1007).

Also, the PEaaS interface 305 may operate a recurring task 1099 to poll (not shown) for suspension values. The PEaaS interface 305 may hold a suspension value taken from a received signal 1016 associated with this recurring task 1099 in cache 1009.

The PEaaS interface 305 may check available suspension values in the cache 1009 responsive to receipt of suspension queries from the TPP 301. For instance, the PEaaS interface 305 may check (not shown) the infraction cache 1009 in response to each of suspension checks 1008 and 1058 for user requests 1006 and 1056, respectively.

In the illustration, the suspension value of signal 1016 is for a user of the user requests 1006 and 1056. However, the suspension check 1008 is before the suspension value of signal 1016 is cached (in the cache 1009); therefore, the PEaaS interface 305 signals no suspension 1010 to the TPP 301 based on any available suspension values at that time. In contrast, the suspension check 1058 is after the suspension value of signal 1016 is cached; therefore, the PEaaS interface 305 signals user suspended 1060 to the TPP 301 due to the suspension value in the cache 1009. The TPP 301 may transmit a request denial 1080 to the user system 12 for user request 1056.

Figure 11:
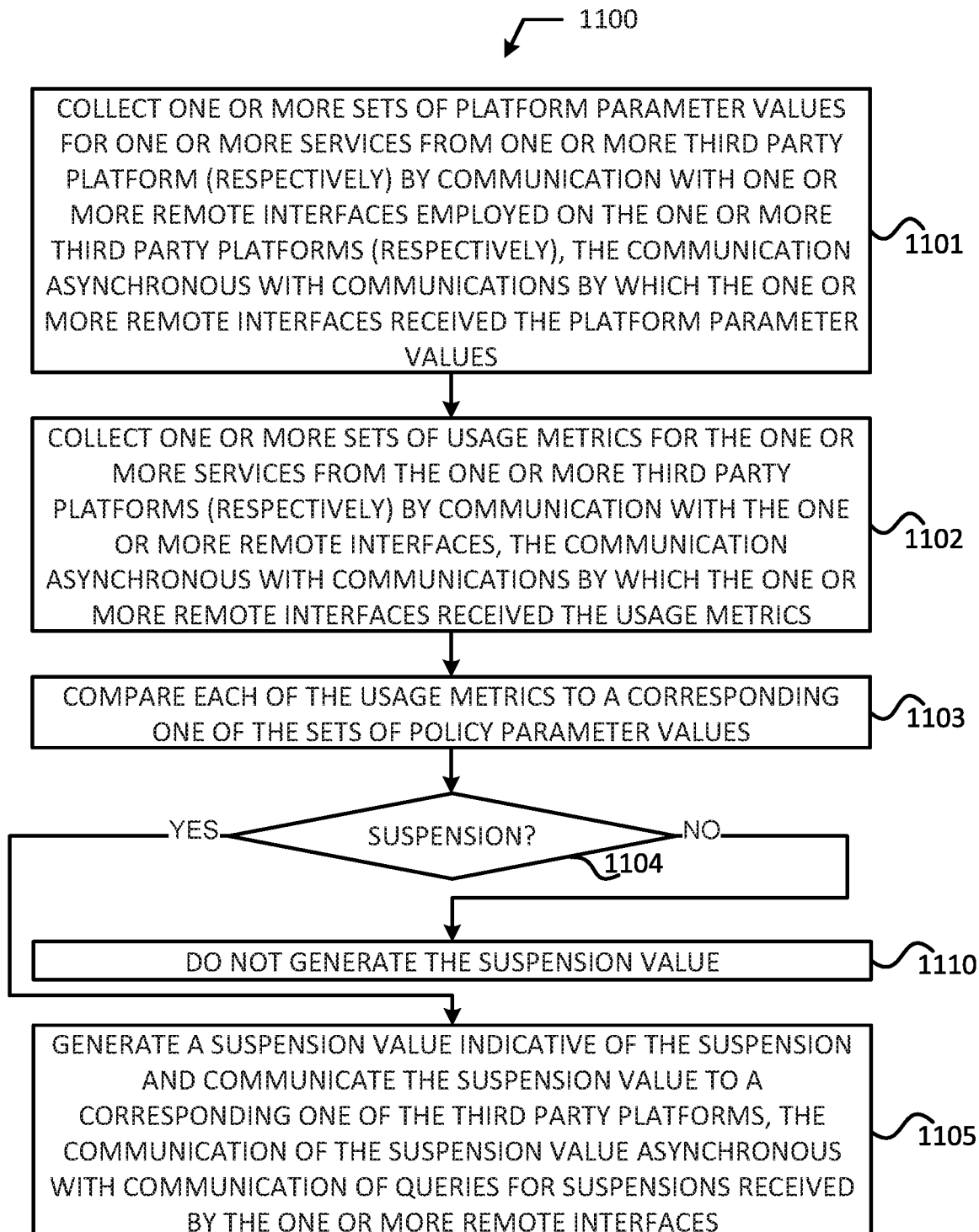
FIG. 11 shows another example process for enclosed/wrapped asynchronous pushing and/or pulling data between PEaaS components, in accordance with various embodiments.

FIG. 11 shows a process 1100 that may be performed by any system described herein, such as system 300A (FIG. 3A) or any other system described herein for PEaaS with a central database system and one or more remote interfaces employed on one or more third party platforms (respectively). In block 1101, the system (e.g., the central database system) may collect one or more sets of platform parameter values for one or more services from one or more third party platforms (respectively) by communication with the one or more remote interfaces (e.g., may identify various values that define one or more policies specified by the one or more third party platforms). This communication may be asynchronous with communications by which the one or more remote interfaces received the platform parameter values.

In block 1102, the system may collect one or more sets of usage metric for the one or more services from the one or more third party platforms by communication with the one or more remote interfaces (respectively). This communication may be asynchronous with communications by which the one or more remote interfaces received the usage metrics.

In block 1103, the system may compare each of the usage metrics to a corresponding one of the sets of policy parameter values (e.g., the usage metric may be checked based on a threshold defined by a corresponding one of the policy parameter values). In response to identification of a suspension of one of the users for one of the one or more distributed services in diamond 1104, in block 1105 the system may generate a suspension value indicative of the suspension and communicate the suspension value to a corresponding one of the third party platforms. This communication may be asynchronous with communication of queries for suspensions received by the one or more remote interfaces. If no suspension is identified, in block 1110 the system may not generate the suspension value.

FIGS. 4-11 illustrate various processes for practicing the example embodiments discussed herein. For illustrative purposes, the operations of the processes of FIGS. 4-11 are described as being performed by elements/components/devices shown and described with regard to FIGS. 1A-3E; however, other computing devices may operate the depicted processes in a multitude of implementations, arrangements, and/or environments. In embodiments, the processes may be embodied as program code stored in a memory system, which when executed by a processing device or a processor system of a computer device/system, may cause the computer device/system to perform the various operations of such processes. While particular examples and orders of operations are illustrated in FIGS. 4-11, in various embodiments, these operations may be re-ordered, separated into additional operations, combined, or omitted altogether.

VI. Non-Limiting Examples

The following examples pertain to further embodiments. Elements and features discussed in any of the following examples may be used anywhere in one or more embodiments discussed previously, elements/features of the one or more embodiments may also be combined with any of the following examples. Furthermore, any of the following examples may be combined unless explicitly stated otherwise.

Example A01 may include a computer program to provide a Policy Enforcement as a Service (PEaaS) to be used by a third party platform (TPP) of a plurality of TPPs, the computer program comprising a set of instructions operable to: generate or update, in response to each received user request to access a service provided by a TPP of the plurality of TPPs, usage metrics of a user system that sent the user request; store the usage metrics in a database; generate, in response to each received user request to access the service, alert attribute value pairs (AVPs), each alert AVP comprising: a value to indicate a client identifier (client_id) of a user that sent a user request, and an attribute to indicate a policy identifier (policy_id), the policy_id to indicate a policy defined by the TPP for the service provided by the TPP; store each alert AVP in a message queue; determine, in response to obtaining a dequeued alert, whether an infraction has occurred based on the usage metrics, the infraction being a violation of the policy indicated by the policy_id of the dequeued alert that is committed by a user indicated by the client_id of the dequeued alert; determine, during an evaluation period of each alert AVP, whether the user should be suspended from using the service based on a number of infractions committed by the user during a defined time period; and transmit, in response to a request for suspended users, an indication of the suspended user.

Example A02 may include the computer program of example A01 and/or some other examples herein, wherein the set of instructions is operable to: obtain one or more policies from individual TPPs of the plurality of TPPs, respectively, each policy of the one or more policies corresponds with a service provided by respective TPPs of the plurality of TPPs, and each policy is to define a threshold number of infractions to occur over a defined period of time for issuing a suspension for a corresponding service.

Example A03 may include the computer program of example A02 and/or some other examples herein, wherein the threshold number of infractions corresponds to a number of user requests that an individual user is permitted to send to a respective TPP.

Example A04 may include the computer program of example A02 and/or some other examples herein, wherein the threshold number of infractions corresponds to a number of user requests including a query or an address to access a resource associated with a corresponding service.

Example A05 may include the computer program of example A02 and/or some other examples herein, wherein each policy is to specify a plurality of suspension levels, each suspension level of the plurality of suspension levels being associated with an amount of time that a user is to be suspended from using a corresponding service, and the set of instructions is operable to: determine a suspension level for each user that is determined to have committed an infraction during the evaluation period.

Example A06 may include the computer program of example A01 and/or some other examples herein, wherein the set of instructions is operable to: dequeue each queued alert according to an evaluation frequency defined by the policy, and the evaluation frequency corresponds to the evaluation period.

Example A07 may include the computer program of example A01 and/or some other examples herein, wherein the database to store the usage metrics is a time series database, the message queue is a Kafka queue, and the policy is to be stored in an object-relational database.

Example A08 may include the computer program of example A07 and/or some other examples herein, wherein the set of instructions is operable to: generate an infraction record for each determined infraction; and store each infraction record in the object-relational database.

Example A09 may include the computer program of example A08 and/or some other examples herein, wherein the indication is to indicate a plurality of users that are determined to be suspended during the second time interval.

Example A10 may include the computer program of example A06 and/or some other examples herein, wherein the set of instructions is operable to: receive a plurality of user requests from a plurality of user systems via a PEaaS interface embedded in a platform of respective TPPs of the plurality of TPPs.

Example A11 may include a computing system, comprising: a processing system communicatively coupled with a memory system, wherein the processing system is configured to: collect one or more sets of policy parameter values from one or more third party platforms, respectively, wherein each set of policy parameter values defines a threshold for issuing a user suspension for a service provided by a respective one of the TPPs, collect one or more usage metric sets for the one or more services from the one or more TPPs, respectively, where each usage metric set includes one or more usage metrics for one or more users, respectively, for a corresponding one of the services, compare each of the usage metrics to a corresponding one of the sets of policy parameter values to identify users that have committed one or more infractions for one of the one or more services, and generate, in response to identification of ones of the identified users that have committed a number of infractions of the threshold, suspension values indicative of the suspension of corresponding ones of the identified users; and a communication system communicatively coupled with the processing system, the communication system configured to transmit the suspension values to corresponding ones of the TPPs, the suspension value usable by the corresponding ones of the TPPs to determine whether to deny requests from the ones of the identified users for respective services, or not.

Example A12 may include the computing system of example A11 and/or some other examples herein, wherein the processing system is configured to: control storage of the one or more usage metric sets in a first database; and control storage of the one or more sets of policy parameter values in a second database.

Example A13 may include the computing system of example A12 and/or some other examples herein, wherein the processing system is configured to: generate alerts for each of the collected one or more usage metric sets, the alerts comprising a key value pair comprising an identifier of a set of the one or more sets of policy parameter values as a key of the key value pair and an identifier of a user of the one or more users as a value of the key value pair; and control storage of the alerts in a message queue.

Example A14 may include the computing system of example A13 and/or some other examples herein, wherein the first database is a time series database, the second database is a object-relational database, and the message queue is a Kafka queue.

Example A15 may include the computing system of example A11 and/or some other examples herein, wherein the threshold is a maximum number of infractions to occur over a defined period of time, and each infraction is a defined number of user requests sent over the defined period of time.

Example A16 may include a system for providing Policy Enforcement as a Service (PEaaS) comprising: a plurality of third party platforms (TPPs), each of which is to implement one or more services and a PEaaS interface, each TPP of the plurality of TPPs is to register a policy for corresponding ones of the one or more services with the PEaaS interface, and each of the services are to stream user and service parameters to the PEaaS interface; an application server to implement a PEaaS web service (PEaaS-WS) that is in communication with each PEaaS interface implemented by each of the plurality of TPPs, the PEaaS-WS to: obtain registered policies and the user and service parameters from each PEaaS interface, and generate alerts, each generated alert to indicate a user identifier of a user that requests use of a service of the one or more services and a policy associated with the requested service; and a PEaaS backend system (PEaaS-BES) in communication with the PEaaS-WS, the PEaaS-BES to determine whether users indicated by the generated alerts have committed infractions, and determine whether any of the users that have committed infractions is to be suspended.

Example A17 may include the system for providing the PEaaS of example A16 and/or some other examples herein, wherein the PEaaS-BES comprises an object-relational database (ORDB), a time series database (TSDB), and a message queue, wherein the PEaSS-WS is to control storage of the user and service parameters as usage metrics in the TSDB, control storage of each policy in the ORDB, and queuing of the generated alerts in the message queue.

Example A18 may include the system for providing the PEaaS of example A17 and/or some other examples herein, wherein the PEaaS-BES is to evaluate the queued alerts using the stored usage metrics of a user indicated by each queued alert and according to an evaluation period indicated by a policy of each generated alert.

Example A19 may include the system for providing the PEaaS of example A18 and/or some other examples herein, wherein the PEaaS-BES is to: generate, for each evaluated alert, an infraction record when a user indicated by an alert is determined to have violated a policy indicated by the alert; and control storage of the infraction record in the ORDB.

Example A20 may include the system for providing the PEaaS of example A19 and/or some other examples herein, wherein the PEaaS-WS is to: pull infraction records stored in the ORDB; determine a set of users indicated by the pulled infraction records is to be suspended; generate a list of suspensions to indicate the set of users to be suspended; and transmit the list of suspensions to a PEaaS interface implemented by a requesting TPP.

Example B01 is a computing system, comprising: a processing system; and a memory device coupled to the processing system and including instructions stored thereon that, in response to execution by the processing system, are operable to perform operations including: collect one or more sets of policy parameter values from one or more third party platforms, respectively, wherein each set of policy parameter values defines a threshold for issuing a user suspension for a service provided by a respective one of the third party platforms; collect one or more usage metric sets for the one or more services from the one or more third party platforms, respectively, where each usage metric set includes one or more usage metrics for one or more users, respectively, for a corresponding one of the services; compare each of the usage metrics to a corresponding one of the sets of policy parameter values; and wherein a service of the one or more services comprises a distributed service provided by a plurality of hosts, and wherein the usage metrics of the usage metric set corresponding to the distributed service comprises first usage metrics from a first host of the plurality of hosts and one or more second usage metrics from one or more second host of the plurality of hosts, respectively; in responsive to identification of a suspension of one of the users for one of the one or more services, generate a suspension value indicative of the suspension and transmit the suspension value to a corresponding one of the third party platforms, the suspension value usable by the corresponding third party platform to determine whether to deny a request from the user for the distributed service, or not; wherein in response to the service corresponding to the suspension including the distributed service, transmit the suspension value to the corresponding one of the third party platforms further includes: transmit the suspension value to the first host; and propagate the suspension value to the one or more second hosts, respectively.

Example B02 includes the subject matter of example B01, or any other example described herein (including any of examples A01-A20, C01-C20, and/or D01-D20), wherein propagate the suspension value to the one or more second hosts, respectively, further includes: identify one or more synchronization requests from the one or more second hosts, respectively; and transmit one or more responses to the one or more synchronization requests, respectively, wherein each of the one or more responses includes the suspension value.

Example B03 includes the subject matter of any of examples B01-B02, or any other example described herein (including any of examples A01-A20, C01-C20, and/or D01-D20), wherein the one or more sets of policy parameter values comprise one or propagation interval values for the one or more third party platforms, respectively, and wherein the one or more synchronization requests are based on a corresponding one of the one or more propagation interval values.

Example B04 includes the subject matter of any of examples B01-B03, or any other example described herein (including any of examples A01-A20, C01-C20, and/or D01-D20), wherein the corresponding one of the one or more propagation interval values is taken from a selection from a corresponding one of the one or more third party platforms.

Example B05 includes the subject matter of any of examples B01-B04, or any other example described herein (including any of examples A01-A20, C01-C20, and/or D01-D20), wherein the corresponding one of the one or more propagation interval values comprises a default.

Example B06 includes the subject matter of any of examples B01-B05, or any other example described herein (including any of examples A01-A20, C01-C20, and/or D01-D20), wherein the one or more synchronization requests are received at one or more times, respectively, based on a same synchronization interval.

Example B7 includes the subject matter of any of examples B1-B6, or any other example described herein (including any of examples A01-A20, C01-C20, and/or D01-D20), the suspension value is delivered to one or more client interfaces of each of the plurality of hosts.

Example B08 includes the subject matter of any of examples B01-B07, or any other example described herein (including any of examples A01-A20, C01-C20, and/or D01-D20), wherein transmit the suspension value to the first host comprises transmit the suspension value to only the first host, and wherein propagate the suspension value to the one or more second hosts, respectively, occurs following transmit the suspension value to only the first host.

Example B09 includes the subject matter of any of examples B01-B08, or any other example described herein (including any of examples A01-A20, C01-C20, and/or D01-D20), wherein each threshold of the one or more thresholds is based on an infraction count for a count period.

Example B10 includes the subject matter of any of examples B01-B09, or any other example described herein (including any of examples A01-A20, C01-C20, and/or D01-D20), wherein the one or more thresholds comprise one or more first thresholds, wherein the user suspension comprises a first user suspension having a first characteristic, and wherein each set of policy parameter values defines a second threshold for issuing a second user suspension having a second characteristic that is different than the first characteristic.

Example B11 is a method, comprising: collecting one or more sets of policy parameter values from one or more third party platforms, respectively, wherein each set of policy parameter values defines a threshold for issuing a user suspension for a service provided by a respective one of the third party platforms; collecting one or more usage metric sets for the one or more services from the one or more third party platforms, respectively, where each usage metric set includes one or more usage metrics for one or more users, respectively, for a corresponding one of the services; comparing each of the usage metrics to a corresponding one of the sets of policy parameter values; and wherein a service of the one or more services comprises a distributed service provided by a plurality of hosts, and wherein the usage metrics of the usage metric set corresponding to the distributed service comprises first usage metrics from a first host of the plurality of hosts and one or more second usage metrics from one or more second host of the plurality of hosts, respectively; in responsive to identification of a suspension of one of the users for one of the one or more services, generating a suspension value indicative of the suspension and transmitting the suspension value to a corresponding one of the third party platforms, the suspension value usable by the corresponding third party platform to determine whether to deny a request from the user for the distributed service, or not; wherein in response to the service corresponding to the suspension including the distributed service, transmitting the suspension value to the corresponding one of the third party platforms further includes: transmitting the suspension value to the first host at a first time; and propagating the suspension value to the one or more second hosts at one or more second times, respectively.

Example B12 includes the subject matter of example B11, or any other example described herein (including any of examples A01-A20, C01-C20, and/or D01-D20), wherein propagating the suspension value to the one or more second hosts at the one or more second times, respectively, further includes: identifying one or more synchronization requests from the one or more second hosts, respectively; and transmitting one or more responses to the one or more synchronization requests, respectively, wherein each of the one or more responses includes the suspension value.

Example B13 includes the subject matter of any of examples B11-B12, or any other example described herein (including any of examples A01-A20, C01-C20, and/or D01-D20), wherein the one or more sets of policy parameter values comprise one or propagation interval values for the one or more third party platforms, respectively, and wherein the one or more synchronization requests are based on a corresponding one of the one or more propagation interval values.

Example B14 includes the subject matter of any of examples B11-B13, or any other example described herein (including any of examples A01-A20, C01-C20, and/or D01-D20), wherein the corresponding one of the one or more propagation interval values is taken from a selection from a corresponding one of the one or more third party platforms.

Example B15 includes the subject matter of any of examples B11-B14, or any other example described herein (including any of examples A01-A20, C01-C20, and/or D01-D20), wherein the corresponding one of the one or more propagation interval values comprises a default.

Example B16 includes the subject matter of any of examples B11-B15, or any other example described herein (including any of examples A01-A20, C01-C20, and/or D01-D20), wherein the one or more synchronization requests are received at one or more third times, respectively, based on a same synchronization interval.

Example B17 includes the subject matter of any of examples B11-B16, or any other example described herein (including any of examples A01-A20, C01-C20, and/or D01-D20), the suspension value is delivered to one or more client interfaces of each of the plurality of hosts.

Example B18 includes the subject matter of any of examples B11-B17, or any other example described herein (including any of examples A01-A20, C01-C20, and/or D01-D20), wherein transmitting the suspension value to the first host comprises transmitting the suspension value to only the first host, and wherein propagating the suspension value to the one or more second hosts, respectively, occurs following transmitting the suspension value to only the first host.

Example B19 is a computing system, comprising: a processing system; and a memory device coupled to the processing system and including instructions stored thereon that, in response to execution by the processing system, are operable to perform operations including: transmit, to a central database for one or more third party platforms, a set of policy parameter values, wherein the set of policy parameter values defines a threshold for issuing a user suspension for a distributed service provided by a plurality of hosts of one of the third party platforms; transmit a metric set for the service for comparison by the central database system of each of the usage metrics to the set of policy parameter values, wherein the usage metric set includes one or more usage metrics for one or more users, respectively, for the service; wherein the usage metrics of the usage metric set comprises first usage metrics from a first host of the plurality of hosts and one or more second usage metrics from one or more second host of the plurality of hosts, respectively; following transmission of the metric set, receive, by the first host at a first time, a first communication including a suspension value indicative of a suspension of one of the users for the distributed service, the suspension value usable to determine whether to deny a request from the user for the distributed service, or not; and receiving one or more second communications, by the one or more second hosts at one or more second times, respectively, each of the one or more second communications including the suspension value.

Example B20 includes the subject matter of example B19, or any other example described herein (including any of examples A01-A20, C01-C20, and/or D01-D20), wherein the operations further comprise: receiving, by a first processor that is of the processing system and corresponding to the first host, a communication of a user request for the distributed service; determining, by the first processor and using the suspension value, whether to deny the user request, or not, following receipt of the first communication including the suspension value; receiving, by a second different processor that is of the processing system and corresponding to a second host of the one or more hosts, a communication of an addition user request for the distributed service; and determining, by the second processor and using the suspension value, whether to deny the additional user request following receipt of a corresponding one of the one or more second communications.

Example C01 may include a computer program to provide a Policy Enforcement as a Service (PEaaS) to be used by a third party platform (TPP) of a plurality of TPPs, the computer program comprising a set of instructions operable to: generate or update, in response to each received user request to access a service provided by a TPP of the plurality of TPPs, usage metrics of user systems that sent each received user request; generate or update, in response to each received user request to access the service provided by the TPP, an alert database object (DBO) to store alert attribute value pairs (AVPs) for each received user request, each alert AVP comprising: a value to indicate a client identifier (client_id) associated with a user that sent a user request, and an attribute to indicate a policy identifier (policy_id), the policy_id indicating a policy defined by the TPP for the service provided by the TPP; determine, in response to obtaining a dequeued alert AVP, whether an infraction has occurred based on the usage metrics, the infraction being a violation of the policy indicated by the policy_id of the dequeued alert AVP that is committed by a user indicated by the client_id of the dequeued alert AVP; generate or update a suspension DBO including infraction records, each infraction record comprising: an infraction client_id field to indicate a client_id of a user that has committed one or more infractions, and a suspension period field to indicate a suspension period, the suspension period being a period time that a user indicated by the suspended client_id field is to be prevented from accessing the service; and control transmission, in response to a request for suspended users, of a suspension indication to indicate the suspension DBO.

Example C02 may include the computer program of example C01 and/or some other examples herein, wherein the set of instructions is operable to: delete an individual infraction record from the suspension DBO when a suspension period indicated by the individual suspension record has expired.

Example C03 may include the computer program of example C02 and/or some other examples herein, wherein the set of instructions is operable to: generate a reinstatement message when the suspension period indicated by the individual suspension record has expired, the reinstatement message to indicate that the suspension period indicated by the individual suspension record has expired.

Example C04 may include the computer program of example C03 and/or some other examples herein, wherein the set of instructions is operable to: control transmission of the reinstatement message after the reinstatement message has been generated; or control transmission of a message that includes both the reinstatement message and the suspension indication.

Example C05 may include the computer program of example C03 and/or some other examples herein, wherein each infraction record further comprises a policy enabled field to indicate whether a policy defined for the service is active or inactive for the user indicated by the infraction client_id field, and the set of instructions is operable to: update the policy enabled field to indicate that the policy defined for the service is inactive when a suspension period for the user indicated by the infraction client_id field has expired.

Example C06. A computing system, comprising: a processing system communicatively coupled with a memory system, wherein the processing system is configured to: collect one or more sets of policy parameter values from one or more third party platforms, respectively, wherein each set of policy parameter values defines a threshold for issuing a user suspension for a service provided by a respective one of the TPPs, collect one or more usage metric sets for the one or more services from the one or more TPPs, respectively, where each usage metric set includes one or more usage metrics for one or more users, respectively, for a corresponding one of the services, compare each of the usage metrics to a corresponding one of the sets of policy parameter values to identify users that have committed one or more infractions for one of the one or more services, generate, in response to identification of ones of the identified users that have committed a number of infractions of the threshold, infraction records indicative of a suspension of corresponding ones of the identified users, and generate or update a suspension set to include the infraction records; and a communication system communicatively coupled with the processing system, the communication system configured to transmit the suspension indications to corresponding ones of the TPPs, the suspension indications usable by the corresponding ones of the TPPs to determine whether to deny requests from the ones of the identified users for respective services, or not.

Example C07 may include the computing system of example C06 and/or some other examples herein, wherein each infraction record in the suspension set comprises: an infraction client_id field to indicate a client_id of a user that has committed one or more infractions; and a suspension period field to indicate a suspension period, the suspension period being a period time that a user indicated by the suspended client_id field is to be prevented from accessing the service.

Example C08 may include the computing system of example C06 and/or some other examples herein, wherein the processing system is configured to: delete individual infraction records from the suspension set when a suspension period indicated by the individual suspension records has expired.

Example C09 may include the computing system of example C08 and/or some other examples herein, wherein the processing system is configured to: generate reinstatement messages when the suspension period indicated by the individual suspension records has expired, the reinstatement message to indicate that the suspension period indicated by the individual suspension records has expired.

Example C10 may include the computing system of example C09 and/or some other examples herein, wherein the communication system is configured to transmit the reinstatement message after the reinstatement message has been generated.

Example C11 may include the computing system of example C09 and/or some other examples herein, wherein the processor system is configured to generate a message that includes both the reinstatement messages and the suspension indications, and wherein the communication system configured to transmit the message to the corresponding ones of the TPPs.

Example C12 may include the computing system of example C07 and/or some other examples herein, wherein each infraction record further comprises a policy enabled field to indicate whether a policy defined for the service is active or inactive for the user indicated by the infraction client_id field, and the processing system is configured to: update the policy enabled field to indicate that the policy defined for the service is inactive when a suspension period for the user indicated by the infraction client_id field has expired.

Example C13 may include the computing system of example C06 and/or some other examples herein, wherein the processing system is configured to: control storage of the one or more usage metric sets in a time series database; control storage of the one or more sets of policy parameter values in an object-relational database; generate alerts for each of the collected one or more usage metric sets, the alerts comprising a key value pair comprising an identifier of a set of the one or more sets of policy parameter values as a key of the key value pair and an identifier of a user of the one or more users as a value of the key value pair; and control storage of the alerts in a message queue.

Example C14 may include the computing system of example C06 and/or some other examples herein, wherein the threshold is a maximum number of infractions to occur over a defined period of time, and each infraction is a defined number of user requests sent over the defined period of time.

Example C15 may include a system for providing Policy Enforcement as a Service (PEaaS) comprising: a plurality of third party platforms (TPPs), each of which is to implement one or more services and a PEaaS interface, each TPP of the plurality of TPPs is to register a policy for corresponding ones of the one or more services with the PEaaS interface, and each of the services are to stream user and service parameters to the PEaaS interface; an application server to implement a PEaaS web service (PEaaS-WS) that is in communication with each PEaaS interface implemented by each of the plurality of TPPs, the PEaaS-WS to: obtain registered policies and the user and service parameters from each PEaaS interface, and generate alerts, each generated alert to indicate a user identifier of a user that requests use of a service of the one or more services and a policy associated with the requested service; and a PEaaS backend system (PEaaS-BES) in communication with the PEaaS-WS, the PEaaS-BES to generate or update a suspension database object (DBO) to include infraction records for each user indicated by a generated alert that is been determined to have violated corresponding policy indicated by the generate alert, each infraction record comprising: an infraction client_id field to indicate a client_id of a user that has committed one or more infractions, and a suspension period field to indicate a suspension period, the suspension period being a period time that a user indicated by the suspended client_id field is to be prevented from accessing the service.

Example C16 may include the system for providing the PEaaS of example C15 and/or some other examples herein, wherein the PEaaS-BES comprises an object-relational database (ORDB), a time series database (TSDB), and a message queue, wherein the PEaSS-WS is to control storage of the user and service parameters as usage metrics in the TSDB, control storage of each policy in the ORDB, and control queuing of the generated alerts in the message queue.

Example C17 may include the system for providing the PEaaS of example C16 and/or some other examples herein, wherein the PEaaS-BES is to: evaluate the queued alerts using the stored usage metrics of a user indicated by each queued alert and according to an evaluation period indicated by a policy of each generated alert; and control storage of the infraction records in the ORDB.

Example C18 may include the system for providing the PEaaS of example C17 and/or some other examples herein, wherein the PEaaS-WS is to: pull the infraction records stored in the ORDB; and generate, for each of the plurality of TPPs, suspension indications to indicate users included in the suspension DBO; and transmit the list of suspensions to a PEaaS interface implemented by a requesting TPP.

Example C19 may include the system for providing the PEaaS of example C18 and/or some other examples herein, wherein each infraction record further comprises a policy enabled field to indicate whether a policy defined for the service is active or inactive for the user indicated by the infraction client_id field, and the PEaaS-WS is to: delete an individual infraction record from the suspension DBO when a suspension period indicated by the individual suspension record has expired; and update the policy enabled field to indicate that the policy defined for the service is inactive when a suspension period for the user indicated by the infraction client_id field has expired.

Example C20 may include the system for providing the PEaaS of example C18 and/or some other examples herein, wherein the PEaaS-WS is to: generate a reinstatement message when the suspension period indicated by the individual suspension record has expired, the reinstatement message to indicate that the suspension period indicated by the individual suspension record has expired; and transmit the reinstatement message after the reinstatement message has been generated or transmit a message that includes both the reinstatement message and the suspension indication.

Example D01 is a computing system, comprising: a processing system; and a memory device coupled to the processing system and including instructions stored thereon that, in response to execution by the processing system, are operable to perform operations including: collect one or more sets of policy parameter values from one or more third party platforms, respectively, by communication with one or more remote interfaces employed on the one or more third party platforms, respectively, wherein each set of policy parameter values defines a threshold for issuing a user suspension for a service provided by a respective one of the third party platforms; collect one or more sets of usage metrics for the one or more services from the one or more third party platforms, respectively, by communication with the one or more remote interfaces, the one or more sets of usage metrics for one or more users, respectively; wherein the communication with the one or more remote interfaces to collect the one or more sets of usage metrics is asynchronous with communications by which the one or more remote interfaces received the usage metrics; compare each of the usage metrics to a corresponding one of the sets of policy parameter values; and in responsive to identification of a suspension of one of the users for one of the one or more services, generate a suspension value indicative of the suspension and communicate the suspension value to a corresponding one of the third party platforms, the suspension value usable by a corresponding third party platform to determine whether to deny a request from the user for the service, or not.

Example D02 includes the subject matter of example D01, or any other example described herein (including any of examples A01-A20, B01-B20, and/or C01-C20), wherein the communication of the suspension value is asynchronous with communication of queries for suspensions received by the one or more remote interfaces.

Example D03 includes the subject matter of any of examples D01-D02, or any other example described herein (including any of examples A01-A20, B01-B20, and/or C01-C20), wherein the communication of the suspension value comprises a response to a poll for suspensions by the corresponding one of the third party platforms.

Example D04 includes the subject matter of any of examples D01-D03, or any other example described herein (including any of examples A01-A20, B01-B20, and/or C01-C20), wherein the communication with the one or more remote interfaces to collect the one or more sets of policy parameter values is asynchronous with communications by which the one or more remote interfaces received the platform parameter values of the one or more platform parameter sets.

Example D05 includes the subject matter of any of examples D01-D04, or any other example described herein (including any of examples A01-A20, B01-B20, and/or C01-C20), wherein the communication with the one or more remote interfaces to collect the one or more sets of policy parameter values is asynchronous with communications by which the one or more remote interfaces received the platform parameter values of the one or more platform parameter sets.

Example D06 includes the subject matter of any of examples D01-D05, or any other example described herein (including any of examples A01-A20, B01-B20, and/or C01-C20), wherein each query includes some of the data of the one or more sets of usage metrics, including at least one of the usage metrics.

Example D07 includes the subject matter of any of examples D01-D06, or any other example described herein (including any of examples A01-A20, B01-B20, and/or C01-C20), wherein the communication with the one or more remote interfaces to collect the one or more sets of usage metric comprises push the one or more sets of usage metrics from the one or more remote interfaces, respectively.

Example D08 includes the subject matter of any of examples D01-D07, or any other example described herein (including any of examples A01-A20, B01-B20, and/or C01-C20), wherein the pushing is based on a first interval, and wherein the communication of the suspension value comprises a response to a poll for suspensions by the corresponding one of the third party platforms, the poll for suspensions based on a second interval.

Example D09 includes the subject matter of any of examples D01-D08, or any other example described herein (including any of examples A01-A20, B01-B20, and/or C01-C20), wherein the second interval is different than the first interval.

Example D10 includes the subject matter of any of examples D01-D9, or any other example described herein (including any of examples A01-A20, B01-B20, and/or C01-C20), wherein the communication with the one or more remote interfaces to collect the one or more sets of usage metrics comprises pushing the one or more sets of policy parameter values from the one or more remote interfaces, respectively.

Example D11 is a method, comprising: collecting one or more sets of policy parameter values from one or more third party platforms, respectively, by communication with one or more remote interfaces employed on the one or more third party platforms, respectively, wherein each set of policy parameter values defines a threshold for issuing a user suspension for a service provided by a respective one of the third party platforms; collecting one or more sets of usage metrics for the one or more services from the one or more third party platforms, respectively, by communication with the one or more remote interfaces, the one or more sets of usage metrics for one or more users, respectively; wherein the communication with the one or more remote interfaces to collect the one or more sets of usage metrics is asynchronous with communications by which the one or more remote interfaces received the usage metrics; comparing each of the usage metrics to a corresponding one of the sets of policy parameter values; and in responsive to identification of a suspension of one of the users for one of the one or more services, generating a suspension value indicative of the suspension and communicating the suspension value to a corresponding one of the third party platforms, the suspension value usable by a corresponding third party platform to determine whether to deny a request from the user for the service, or not.

Example D12 includes the subject matter of example D11, or any other example described herein (including any of examples A01-A20, B01-B20, and/or C01-C20), wherein the communication of the suspension value is asynchronous with communication of queries for suspensions received by the one or more remote interfaces.

Example D13 includes the subject matter of any of examples D11-D12, or any other example described herein (including any of examples A01-A20, B01-B20, and/or C01-C20), wherein the communication of the suspension value comprises a response to a poll for suspensions by the corresponding one of the third party platforms.

Example D14 includes the subject matter of any of examples D11-D13, or any other example described herein (including any of examples A01-A20, B01-B20, and/or C01-C20), wherein the communication with the one or more remote interfaces to collect the one or more sets of policy parameter values is asynchronous with communications by which the one or more remote interfaces received the platform parameter values of the one or more platform parameter sets.

Example D15 includes the subject matter of any of examples D11-D14, or any other example described herein (including any of examples A01-A20, B01-B20, and/or C01-C20), wherein the communication with the one or more remote interfaces to collect the one or more sets of policy parameter values is asynchronous with communications by which the one or more remote interfaces received the platform parameter values of the one or more platform parameter sets.

Example D16 includes the subject matter of any of examples D11-D15, or any other example described herein (including any of examples A01-A20, B01-B20, and/or C01-C20), wherein each query includes some of the data of the one or more sets of usage metrics, including at least one of the usage metrics.

Example D17 includes the subject matter of any of examples D11-D16, or any other example described herein (including any of examples A01-A20, B01-B20, and/or C01-C20), wherein the communication with the one or more remote interfaces to collect the one or more sets of usage metric comprises pushing the one or more sets of usage metrics from the one or more remote interfaces, respectively.

Example D18 includes the subject matter of any of examples D11-D17, or any other example described herein (including any of examples A01-A20, B01-B20, and/or C01-C20), wherein the pushing is based on a first interval, and wherein the communication of the suspension value comprises a response to a poll for suspensions by the corresponding one of the third party platforms, the poll for suspensions based on a second interval.

Example D19 includes the subject matter of any of examples D11-D18, or any other example described herein (including any of examples A01-A20, B01-B20, and/or C01-C20), wherein the second interval is different than the first interval.

Example D20 includes the subject matter of any of examples D11-D19, or any other example described herein (including any of examples A01-A20, B01-B20, and/or C01-C20), wherein the communication with the one or more remote interfaces to collect the one or more sets of usage metrics comprises pushing the one or more sets of policy parameter values from the one or more remote interfaces, respectively.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. One or more non-transitory computer-readable media (NTCRM) comprising instructions for providing a Policy Enforcement as a Service web service (PEaaS-WS), wherein execution of the instructions by one or more processors of a computing system is operable to cause the computing system to:

obtain one or more policies from individual third party platforms (TPPs) of the plurality of TPPs, respectively, each policy of the one or more policies corresponds with a service provided by respective TPPs of the plurality of TPPs, and each policy defines a threshold number of infractions to occur over a defined period of time for issuing a suspension for a corresponding service;

generate or update, in response to receipt of each user request to access a service provided by a TPP of a plurality of TPPs, usage metrics of a user system that sent each user request;

store the usage metrics in a database, the usage metrics being based on interactions between the user system and the TPP;

generate, based on each received user request to access the service, alert attribute value pairs (AVPs), each alert AVP comprising: a value to indicate a client identifier (client_id) of a user or the user system that sent a user request, and an attribute to indicate a policy identifier (policy_id), the policy_id to indicate a policy defined by the TPP for the service provided by the TPP;

store each alert AVP in a message queue;

determine, in response to obtaining a dequeued alert, whether an infraction has occurred based on the usage metrics, the infraction being a violation of the policy indicated by the policy_id of the dequeued alert that is committed by a user indicated by the client_id of the dequeued alert during an evaluation period defined by the policy indicated by the policy_id of the dequeued alert;

determine whether the user should be suspended from using the service based on a number of infractions committed by the user during a defined time period; and transmit, in response to a request for suspended users, an indication of the suspended user.

2. The one or more NTCRM of claim 1, wherein the threshold number of infractions corresponds to a number of user requests that an individual user is permitted to send to a respective TPP.

3. The one or more NTCRM of claim 2, wherein the threshold number of infractions corresponds to a number of user requests including a query or an address to access a resource associated with a corresponding service.

4. The one or more NTCRM of claim 2, wherein each policy is to specify a plurality of suspension levels, each suspension level of the plurality of suspension levels being associated with an amount of time that a user is to be suspended from using a corresponding service, and execution of the instructions is operable to cause the computing system to:

determine a suspension level for each user that is determined to have committed an infraction during the evaluation period.

5. The one or more NTCRM of claim 1, wherein execution of the instructions is operable to cause the computing system to:

dequeue each queued alert according to an evaluation frequency defined by the policy, and the evaluation frequency corresponds to the evaluation period.

6. The one or more NTCRM of claim 1, wherein the database to store the usage metrics is a time series database, the message queue is a Kafka queue, and the policy is to be stored in an object-relational database, and the usage metrics include one or more of an amount of user requests sent by the user system, a payload size of each user request, a query size of each user request, a query type of each user request, resources or database objects included in each user request, an input/output operation of each user request, or computing resources needed to process each user request.

7. The one or more NTCRM of claim 6, wherein execution of the instructions is operable to cause the computing system to:

generate an infraction record for each determined infraction; and store each infraction record in the object-relational database.

8. The one or more NTCRM of claim 7, wherein the indication is to indicate a plurality of users that are determined to be suspended during a time interval.

9. The one or more NTCRM of claim 5, wherein execution of the instructions is operable to cause the computing system to:
receive a plurality of user requests from a plurality of user systems via a PEaaS interface embedded in a platform of respective TPPs of the plurality of TPPs.

10. A computing system, comprising:
processor circuitry communicatively coupled with a memory circuitry, wherein the processor circuitry is configurable to:
collect and store one or more sets of policy parameter values from one or more third party platforms (TPPs), respectively, wherein each set of policy parameter values corresponds to a service provided by a TPP to the one or more of TPPs, and each set of policy parameter values defines a threshold for issuing a user suspension for the service provided by the TPPs,
collect and store one or more usage metric sets provided by the one or more TPPs, respectively, based on receipt of user requests to access services provided by respective TPPs of the one or more TPPs, wherein each usage metric set includes one or more usage metrics for one or more users, respectively, the usage metrics being based on interactions between the one or more users and the respective TPPs,
generate alert attribute value pairs (AVPs) based on each received user request to access the service, each alert AVP including a value to indicate a client identifier (client_id) of a user or user system that sent a user request to access an individual service provided by an individual TPP, and an attribute to indicate a policy identifier (policy_id), the policy_id to indicate a set of policy parameter values defined by the individual TPP to correspond to the individual service,
store each alert AVP in a message queue,
compare, in response to obtaining a dequeued alert, each of the usage metrics to a corresponding one of the sets of policy parameter values to identify users that have committed one or more infractions for one of the one or more services,
determine whether the identified users should be suspended from using the service based on a number of infractions committed by the user during an evaluation period of each alert AVP, and
generate, in response to identification of ones of the identified users that have committed the number of infractions of the threshold, suspension values or corresponding ones of the identified users; and
communication circuitry communicatively coupled with the processor circuitry, the communication circuitry is configurable to transmit the suspension values to corresponding ones of the TPPs, the suspension values usable by the corresponding ones of the TPPs to determine whether to deny requests from the ones of the identified users for respective services.

11. The computing system of claim 10, wherein the processor circuitry is configurable to:
control storage of the one or more usage metric sets in a first database; and
control storage of the one or more sets of policy parameter values in a second database.

12. The computing system of claim 11, wherein the processor circuitry is configurable to:
generate alerts for each of the collected one or more usage metric sets, the alerts comprising a key value pair comprising an identifier of a set of the one or more sets of policy parameter values as a key of the key value pair and an identifier of a user of the one or more users as a value of the key value pair; and
control storage of the alerts in a message queue.

13. The computing system of claim 12, wherein the first database is a time series database, the second database is an object-relational database, and the message queue is a Kafka queue, and the usage metrics include one or more of an amount of user requests sent by the user system, a payload size of each user request, a query size of each user request, a query type of each user request, resources or database objects included in each user request, an input/output operation of each user request, or computing resources needed to process each user request.

14. The computing system of claim 10, wherein the threshold is a maximum number of infractions to occur over a defined period of time, and each infraction is a defined number of user requests sent over the defined period of time.

15. A system for providing Policy Enforcement as a Service (PEaaS) comprising:
a plurality of third party platforms (TPPs), each of which including at least one hardware processor and a memory, and each TPP of the plurality of TPPs is to provide one or more services and implement a PEaaS interface, each TPP of the plurality of TPPs is to register a policy for corresponding ones of the one or more services with the PEaaS interface, each policy defines a threshold number of infractions to occur over a defined period of time for issuing a suspension for a corresponding service, and each of the services are to stream user and service parameters to the PEaaS interface;
one or more application servers, each of which including at least one hardware processor and a memory, the one or more application servers to implement a PEaaS web service (PEaaS-WS) that is in communication with each PEaaS interface implemented by each of the plurality of TPPs, the PEaaS-WS to:
obtain registered policies and the user and service parameters from each TPP via the respective PEaaS interfaces,
store the registered policies and the user and service parameters in respective databases,
generate alerts, each generated alert comprising an attribute value pair (AVP), each AVP comprising a value to indicate a user identifier (user_id) of a user or user system that requests use of a service of the one or more services provided by an individual TPP and an attribute to indicate a policy identifier (policy_id), the policy_id to indicate a policy associated with the requested service as defined by the individual TPP, and
store the generated AVPs in a message queue; and
a PEaaS backend system (PEaaS-BES) comprising one or more server computer systems, the PEaaS in communication with the PEaaS-WS, the PEaaS-BES to:
determine, in response to obtaining a dequeued alert, whether users indicated by the generated alerts have committed infractions as defined by the registered policy indicated by the policy_id of the dequeued alert that is committed by a user indicated by the user_id of the dequeued alert during an evaluation period defined by the policy indicated by the policy_id of the dequeued alert, determine whether any of the users that have committed the infractions is to be suspended.

16. The system for providing the PEaaS of claim 15, wherein the PEaaS-BES comprises an object-relational database (ORDB), a time series database (TSDB), and a message queue, wherein the PEaaS-WS is to store the user and service parameters as usage metrics in the TSDB, store each policy in the ORDB, and queuing of the generated alerts in the message queue, and the usage metrics include one or more of an amount of user requests sent by the user system, a payload size of each user request, a query size of each user request, a query type of each user request, resources or database objects included in each user request, an input/output operation of each user request, or computing resources needed to process each user request.

17. The system for providing the PEaaS of claim 16, wherein the PEaaS-BES is to evaluate the queued alerts using the stored usage metrics of a user indicated by each queued alert and according to an evaluation period indicated by a policy of each generated alert.

18. The system for providing the PEaaS of claim 17, wherein the PEaaS-BES is to:

generate, for each evaluated alert, an infraction record when a user indicated by an alert is determined to have violated a policy indicated by the alert; and control storage of the infraction record in the ORDB.

19. The system for providing the PEaaS of claim 18, wherein the PEaaS-WS is to:

pull infraction records stored in the ORDB;

determine a set of users indicated by the pulled infraction records is to be suspended;

generate a list of suspensions to indicate the set of users to be suspended; and transmit the list of suspensions to a PEaaS interface implemented by a requesting TPP.

\* \* \* \* \*